(12) United States Patent
Farrington et al.

(10) Patent No.: US 7,851,105 B2
(45) Date of Patent: Dec. 14, 2010

(54) ELECTROCHEMICAL FUEL CELL STACK HAVING STAGGERED FUEL AND OXIDANT PLENUMS

(75) Inventors: Simon Farrington, Vancouver (CA); Jeffrey D. Glandt, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 490 days.

(21) Appl. No.: 11/764,721

(22) Filed: Jun. 18, 2007

(65) Prior Publication Data

US 2008/0311461 A1 Dec. 18, 2008

(51) Int. Cl.
*H01M 8/04* (2006.01)
*H01M 2/38* (2006.01)

(52) U.S. Cl. .................. 429/512; 429/458; 429/513
(58) Field of Classification Search ................ None
See application file for complete search history.

(56) References Cited

U.S. PATENT DOCUMENTS

| | | | |
|---|---|---|---|
| 6,066,409 A | 5/2000 | Ronne et al. | |
| 6,080,502 A | 6/2000 | Noelscher et al. | |
| 6,214,486 B1 * | 4/2001 | Okamoto | 429/13 |
| 6,232,008 B1 | 5/2001 | Wozniczka et al. | |
| 6,566,001 B2 | 5/2003 | Yosida et al. | |
| 2002/0119358 A1 | 8/2002 | Rock | |
| 2003/0224239 A1 * | 12/2003 | Carlstrom | 429/38 |
| 2004/0023102 A1 * | 2/2004 | Sugita et al. | 429/38 |
| 2004/0096726 A1 | 5/2004 | Takahashi | |
| 2004/0115512 A1 | 6/2004 | Fujii et al. | |
| 2004/0131905 A1 | 7/2004 | Enjoji et al. | |
| 2004/0191594 A1 | 9/2004 | Kearl | |
| 2005/0014059 A1 | 1/2005 | Kaye | |
| 2005/0064272 A1 | 3/2005 | Frank et al. | |
| 2005/0069749 A1 | 3/2005 | Frank et al. | |
| 2005/0089747 A1 | 4/2005 | Yamaga et al. | |
| 2005/0255364 A1 | 11/2005 | Cho et al. | |
| 2006/0024550 A1 | 2/2006 | Rock et al. | |
| 2006/0035133 A1 * | 2/2006 | Rock et al. | 429/35 |
| 2006/0275645 A1 * | 12/2006 | Gallagher et al. | 429/38 |
| 2007/0178359 A1 * | 8/2007 | Peng et al. | 429/38 |

FOREIGN PATENT DOCUMENTS

| | | |
|---|---|---|
| CA | 2478438 A1 | 9/2003 |
| CA | 2523988 A1 | 12/2004 |
| JP | 7029579 A | 1/1995 |
| JP | 2005294083 A | 10/2005 |
| JP | 2006172924 A | 6/2006 |
| WO | WO 96/37005 A1 | 11/1996 |
| WO | WO 2004/102710 A1 | 11/2004 |

(Continued)

OTHER PUBLICATIONS

International Search Report dated Jan. 19, 2009 (Two (2) pages).

(Continued)

*Primary Examiner*—Melvin C Mayes
*Assistant Examiner*—Sheng H Davis
(74) *Attorney, Agent, or Firm*—Crowell & Moring LLP

(57) ABSTRACT

An electrochemical fuel cell stack having staggered fuel and oxidant plenums is disclosed. This construction allows for reduced cell pitch without reducing plenum thickness and hence fluid flow.

22 Claims, 14 Drawing Sheets

FOREIGN PATENT DOCUMENTS

WO  WO 2006/072924 A1  7/2006

OTHER PUBLICATIONS

Abstract in English of JP 7029579, esp@cenet database, Jan. 31, 1995.

Abstract in English of JP 2005294083, esp@cenet database, Oct. 20, 2005.

Abstract in English of JP 2006172924, esp@cenet database, Jun. 29, 2006.

* cited by examiner

ELECTROCHEMICAL FUEL CELL STACK HAVING STAGGERED FUEL AND OXIDANT PLENUMS

BACKGROUND OF THE INVENTION

1. Field of the Invention

The present invention relates generally to electrochemical fuel cell stacks, and, more particularly, to an electrochemical fuel cell stack having staggered fuel and oxidant plenums.

2. Description of the Related Art

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst, disposed at the interfaces between the electrolyte and the electrodes, typically induces the desired electrochemical reactions at the electrodes. The location of the electrocatalyst generally defines the electrochemically active area.

One type of electrochemical fuel cell is the polymer electrolyte membrane (PEM) fuel cell. PEM fuel cells generally employ a membrane electrode assembly (MEA) comprising a solid polymer electrolyte or ion-exchange membrane disposed between two electrodes. Each electrode typically comprises a porous, electrically conductive substrate, such as carbon fiber paper or carbon cloth, which provides structural support to the membrane and serves as a fluid diffusion layer. The membrane is ion conductive (typically proton conductive), and acts both as a barrier for isolating the reactant streams from each other and as an electrical insulator between the two electrodes. A typical commercial PEM is a sulfonated perfluorocarbon membrane sold by E.I. Du Pont de Nemours and Company under the trade designation NAFION®. The electrocatalyst is typically a precious metal composition (e.g., platinum metal black or an alloy thereof) and may be provided on a suitable support (e.g., fine platinum particles supported on a carbon black support).

In a fuel cell, a MEA is typically interposed between two separator plates that are substantially impermeable to the reactant fluid streams. The plates typically act as current collectors and provide support for the MEA. In addition, the plates may have reactant channels formed therein and act as flow field plates providing access for the reactant fluid streams to the respective porous electrodes and providing for the removal of reaction products formed during operation of the fuel cell.

In a fuel cell stack, a plurality of fuel cells are connected together, typically in series, to increase the overall output power of the assembly. In such an arrangement, one side of a given separator plate may serve as an anode flow field plate for one cell and the other side of the plate may serve as the cathode flow field plate for the adjacent cell. In this arrangement, the plates may be referred to as bipolar plates. Typically, a plurality of inlet ports, supply manifolds, exhaust manifolds and outlet ports are utilized to direct the reactant fluid to the reactant channels in the flow field plates. In addition, further inlet ports, supply manifolds, exhaust manifolds and outlets ports are utilized to direct a coolant fluid to interior passages within the fuel cell stack to absorb heat generated by the exothermic reaction in the fuel cells. The supply and exhaust manifolds may be internal manifolds, which extend through aligned openings formed in the flow field plates and MEAs, or may comprise external or edge manifolds, attached to the edges of the flow field plates.

A broad range of reactants can be used in PEM fuel cells. For example, the fuel may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a PEM fuel cell, fuel is electrochemically oxidized on the anode side, typically resulting in the generation of protons, electrons, and possibly other species depending on the fuel employed. The protons are conducted from the reaction sites at which they are generated, through the membrane, to electrochemically react with the oxidant on the cathode side. The electrons travel through an external circuit providing useable power and then react with the protons and oxidant on the cathode side to generate water reaction product.

The overall power density of a fuel cell stack may be increased by decreasing the fuel cell stack volume by, for example, decreasing the thickness of individual fuel cell stack components such as the reactant plates. However, the minimum fuel cell thickness achievable with current fuel cell stack designs is limited by the manner in which the reactant flow field channels, as well as the reactant passageways and/or plenums fluidly connecting the flow field channels to the respective reactant supply and exhaust manifolds, are stacked on top of one another in the direction perpendicular to the plane of the fuel cells. The presence of coolant flow field channels, passageways, and plenums typically found in conventional fuel cell stacks, present further design challenges and limitations.

Although there have been advances in the field, there remains a need in the art for improved electrochemical fuel cell stack designs that permit further reductions in fuel cell stack volume, and consequently, increases in fuel cell stack power density. The present invention addresses these needs and provides further related advantages.

BRIEF SUMMARY OF THE INVENTION

In brief, the present invention relates generally to electrochemical fuel cell stacks, and, more particularly, to an electrochemical fuel cell stack having staggered fuel and oxidant plenums.

In one embodiment, an electrochemical fuel cell stack is provided, comprising: a plurality of electrochemical fuel cells, each comprising: an anode and a cathode; an anode plate having an active surface facing the anode and an oppositely facing non-active surface, wherein the anode plate active surface comprises a plurality of parallel linear fuel flow field channels, and the anode plate further comprises a fuel supply manifold opening and a fuel supply plenum that fluidly connects the fuel flow field channels to the fuel supply manifold opening; and a cathode plate having an active surface facing the cathode and an oppositely facing non-active surface, wherein the cathode plate active surface comprises a plurality of parallel linear oxidant flow field channels, and the cathode plate further comprises an oxidant supply manifold opening and an oxidant supply plenum that fluidly connects the oxidant flow field channels to the oxidant supply manifold opening, wherein, with respect to each adjoining anode plate and cathode plate in a pair of adjacent fuel cells in the stack, the fuel and oxidant supply plenums of the adjoining anode and cathode plates are staggered so as not to overlap in the direction perpendicular to the plane of the fuel cells.

In further embodiments, the anode plate of each fuel cell may further comprise a fuel supply backfeed channel at least partially formed on the non-active surface of the anode plate, and a fuel supply backfeed port extending through the anode plate that fluidly connects the fuel supply backfeed channel and the fuel supply plenum; and the cathode plate of each fuel cell may further comprise an oxidant supply backfeed channel at least partially formed on the non-active surface of the cathode plate, and a oxidant supply backfeed port extending through the cathode plate that fluidly connects the oxidant supply backfeed channel and the oxidant supply plenum.

In other further embodiments, the fuel supply backfeed channel of each fuel cell may also be at least partially formed on the non-active surface of the adjoining cathode plate of an adjacent fuel cell; and the oxidant supply backfeed channel of each fuel cell may also be at least partially formed on the non-active surface of the adjoining anode plate of an adjacent fuel cell. In such embodiments, the total height of the fuel supply plenum plus the fuel supply backfeed channel may be greater than the thickness of the anode plate. Similarly, the total height of the oxidant supply plenum plus the oxidant supply backfeed channel may be greater than the thickness of the cathode plate.

In other further embodiments, the backfeed ports may be made as large as possible and occupy essentially all the available space in the plenums. In this way, the fuel supply backfeed port may comprise the fuel supply plenum and the oxidant supply backfeed port may comprise the oxidant supply plenum.

In other further embodiments, the anode plate may further comprise a fuel exhaust manifold opening and a fuel exhaust plenum that fluidly connects the fuel flow field channels to the fuel exhaust manifold opening; and the cathode plate may further comprise an oxidant exhaust manifold opening and an oxidant exhaust plenum that fluidly connects the oxidant flow field channels to the oxidant exhaust manifold opening, and, with respect to each adjoining anode plate and cathode plate in a pair of adjacent fuel cells in the stack, the fuel and oxidant exhaust plenums of the adjoining anode and cathode plates are staggered so as not to overlap in the direction perpendicular to the plane of the fuel cells.

In other further embodiments, the anode plate of each fuel cell may further comprise a fuel exhaust backfeed channel at least partially formed on the non-active surface of the anode plate, and a fuel exhaust backfeed port extending through the anode plate that fluidly connects the fuel exhaust backfeed channel and the fuel exhaust plenum; and the cathode plate of each fuel cell may further comprise an oxidant exhaust backfeed channel at least partially formed on the non-active surface of the cathode plate, and an oxidant exhaust backfeed port extending through the cathode plate that fluidly connects the oxidant exhaust backfeed channel and the oxidant exhaust plenum.

In other further embodiments, the fuel exhaust backfeed channel of each fuel cell may also be at least partially formed on the non-active surface of the adjoining cathode plate of an adjacent fuel cell; and the oxidant exhaust backfeed channel of each fuel cell may also be at least partially formed on the non-active surface of the adjoining anode plate of an adjacent fuel cell. In such embodiments, the total height of the fuel exhaust plenum plus the fuel exhaust backfeed channel may be greater than the thickness of the anode plate. Similarly, the total height of the oxidant exhaust plenum plus the oxidant exhaust backfeed channel may be greater than the thickness of the cathode plate.

Again, in other further embodiments, the backfeed ports may be made as large as possible and occupy essentially all the available space in the plenums. In this way, the fuel supply backfeed port may comprise the fuel supply plenum and the oxidant supply backfeed port may comprise the oxidant supply plenum.

In other further embodiments, with respect to each adjoining anode plate and cathode plate in a pair of adjacent fuel cells in the stack, the fuel supply and exhaust plenums of the adjoining anode plate may be staggered so as not to overlap either of the oxidant supply and exhaust plenums of the adjoining cathode plate, in the direction perpendicular to the plane of the fuel cells.

In other further embodiments, the fuel and oxidant supply and exhaust manifold openings form edge fuel and oxidant supply and exhaust manifolds, end fuel and oxidant supply and exhaust manifolds, or side fuel and oxidant supply and exhaust manifolds. The fuel supply and exhaust manifolds may positioned on the same side of the fuel cells; and the oxidant supply and exhaust manifolds may be positioned on the same side of the fuel cells. Alternatively, the fuel and oxidant supply manifolds may be positioned on opposing sides of the fuel cells; and the fuel and oxidant exhaust manifolds may be positioned on opposing sides of the fuel cells. The fuel and oxidant supply and exhaust backfeed ports of each fuel cell may be rectangular in shape and extend along the ends of the fuel cells.

In other further embodiments, each fuel cell may further comprise: a plurality of parallel linear coolant flow field channels formed on the non-active surfaces of the anode and cathode plates; a first coolant supply manifold opening; and a coolant supply plenum that fluidly connects the coolant flow field channels to the first coolant supply manifold opening, wherein, with respect to each adjoining anode plate and cathode plate in a pair of adjacent fuel cells in the stack, the coolant supply plenum and the fuel and oxidant supply and exhaust plenums of the adjoining anode and cathode plates are staggered so as not to overlap in the direction perpendicular to the plane of the fuel cells.

In other further embodiments, each fuel cell may further comprise: a first coolant exhaust manifold opening, and a coolant exhaust plenum that fluidly connects the coolant flow field channels to the first coolant exhaust manifold opening; and, with respect to each adjoining anode plate and cathode plate in a pair of adjacent fuel cells in the stack, the coolant exhaust plenum and the fuel and oxidant supply and exhaust plenums of the adjoining anode and cathode plates are staggered so as not to overlap in the direction perpendicular to the plane of the fuel cells.

In other further embodiments, each fuel cell may further comprise: a second coolant supply manifold opening; and a second coolant exhaust manifold opening, wherein the coolant supply and exhaust plenums also fluidly connect the coolant flow field channels to the second coolant supply and exhaust manifold openings, respectively.

In other further embodiments, the first and second coolant supply and exhaust manifold openings may form side first and second coolant supply and exhaust manifolds; the first and second coolant supply manifolds may be positioned on opposing sides of the fuel cells; and the first and second coolant exhaust manifolds may be positioned on opposing sides of the fuel cells.

These and other aspects of the invention will be evident upon reference to the following detailed description and attached drawings.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with membrane electrode assemblies, reactant flow field plates, fuel cells and fuel cell stacks have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein, adjoining components are components that are in contact with one another, but are not necessarily bonded or adhered to one another. Thus, the terms "adjoining" and "contacting" are intended to be synonymous.

Figure 1:
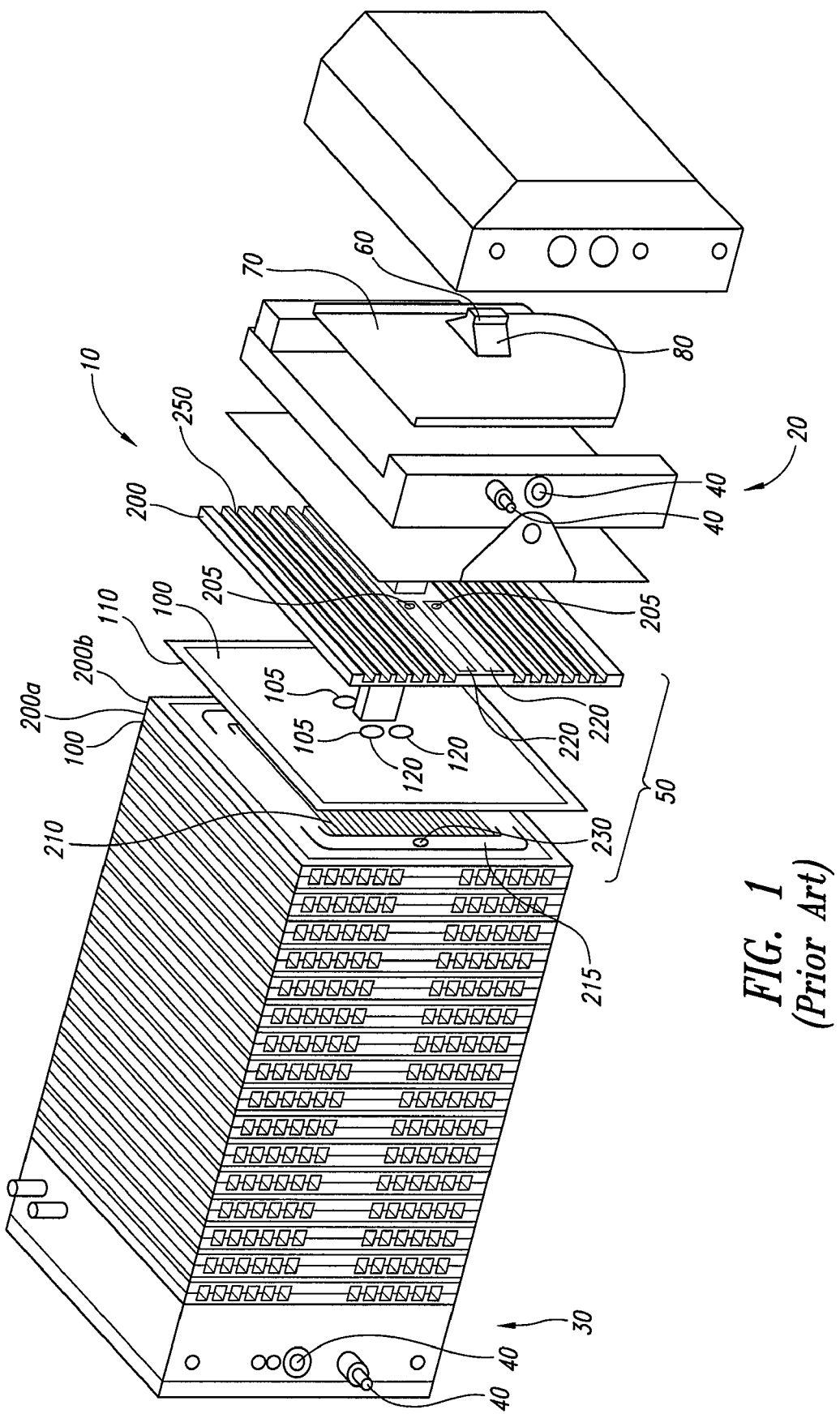
FIG. 1 is a perspective view of a conventional electrochemical fuel cell stack.

FIG. 1 illustrates a conventional electrochemical fuel cell stack 10, as more specifically described in U.S. Pat. Nos. 6,066,409 and 6,232,008, which are incorporated herein by reference. As shown, fuel cell stack 10 includes a pair of end plate assemblies 20 and 30, and a plurality of stacked fuel cells 50, each comprising an MEA 100, and a pair of separator plates 200. Between each adjacent pair of MEAs 100 in the stack, there are two separator plates 200 which have adjoining surfaces. An adjoining pair of separator plates are shown as 200a and 200b. A tension member 60 extends between end plate assemblies 20 and 30 to retain and secure stack 10 in its assembled state. Spring 70 with clamping members 80 grip an end of tension member 60 to apply a compressive force to fuel cells 50 of stack 10.

Fluid reactant streams are supplied to and exhausted from internal manifolds and passages in stack 10 via inlet and outlet ports 40 in end plate assemblies 20 and 30. Aligned internal reactant manifold openings 105 and 205 in MEAs 100 and separator plates 200, respectively, form internal reactant manifolds extending through stack 10. As one of ordinary skill in the art will appreciate, in other representative electrochemical fuel cell stacks, reactant manifold openings may instead be positioned to form edge or external reactant manifolds.

In the illustrated embodiment, perimeter seal 110 is provided around the outer edge of both sides of MEA 100. Manifold seals 120 circumscribe internal reactant manifold openings 105 on both sides of MEA 100. When stack 10 is secured in its assembled, compressed state, seals 110 and 120 cooperate with the adjacent pair of plates 200 to fluidly isolate fuel and oxidant reactant streams in internal reactant manifolds and passages, thereby isolating one reactant stream from the other and preventing the streams from leaking from stack 10.

As illustrated in FIG. 1, each MEA 100 is positioned between the active surfaces of two separator plates 200. Each separator plate 200 has flow field channels 210 (partially shown) on the active surface thereof (which contacts the MEA) for distributing fuel or oxidant fluid streams to the active area of the contacted electrode of the MEA 100. In the embodiment illustrated in FIG. 1, flow field channels 210 on the active surface of plates 200 are fluidly connected to internal reactant manifold openings 205 in plate 200 via reactant supply/exhaust passageways comprising backfeed channels 220 located on the non-active surface of plate 200, backfeed ports 230 extending through (i.e., penetrating the thickness) of plate 200, and reactant plenums 215 located on the active surface of plate 200. As shown, with respect to one port 230, one end of the port 230 is open to a backfeed channel 220, which is in turn open to an internal reactant manifold opening 205, and the other end of the port 230 is open to a plenum 215, which is in turn open to flow field channels 210.

In the illustrated embodiment, separator plates 200 also have a plurality of open-faced linear parallel flow field channels 250 formed in the non-active surface thereof. Channels 250 on adjoining pairs of plates 200 cooperate to form passages extending laterally between the opposing non-active surfaces of adjacent fuel cells 50 of stack 10 (perpendicular to the stacking direction). A coolant stream, such as air, may be directed through these passages to remove heat generated by the exothermic electrochemical reactions which are induced inside the fuel cell stack.

Figure 2B:
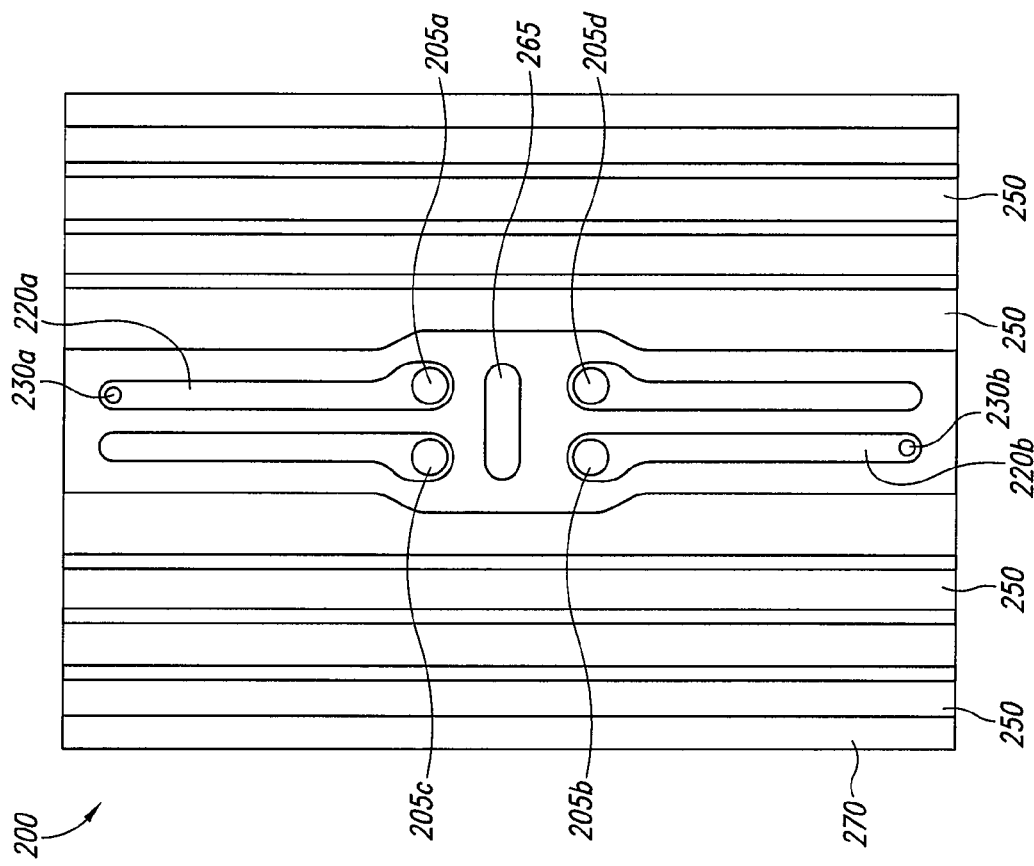
FIGS. 2A and 2B are plan views of the active and non-active surfaces, respectively, of a separator plate of a conventional electrochemical fuel cell stack having internal reactant manifolds.
Figure 2A:
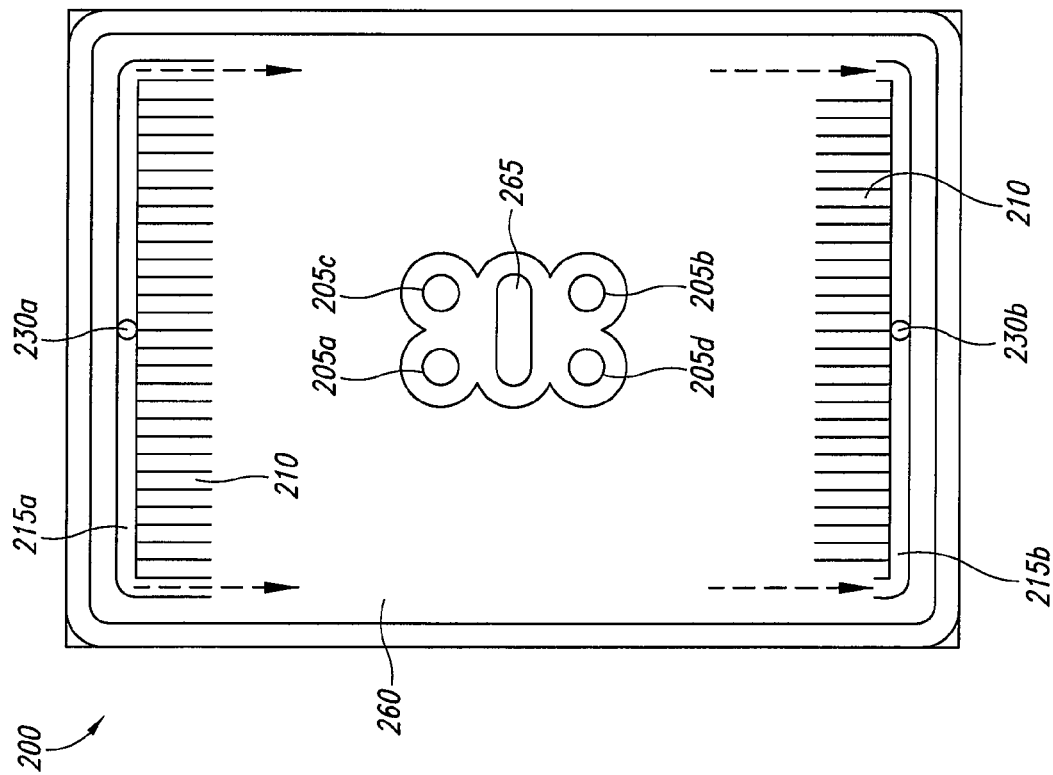

FIGS. 2A and 2B are plan views of the active 260 and non-active 270 surfaces, respectively, of a separator plate 200 of a conventional electrochemical fuel cell stack comprising internal reactant manifolds, such as the fuel cell stack 10 of FIG. 1. Separator plate 200 has openings extending therethrough, namely, reactant supply and exhaust manifold openings 205a-d, and tie rod opening 265. FIG. 2A depicts the active surface 260 of separator plate 200 which, in a fuel cell stack, faces a MEA. Flow field channels, only a portion of which are shown (for clarity) as 210, distribute a reactant stream to the contacted electrode layer of the MEA. Flow field channels 210 may comprise one or more continuous or discontinuous channels. A reactant stream is supplied to and exhausted from flow field channels 210 from the oppositely facing non-active surface 270 of plate 200 via reactant backfeed ports 230a, 230b, which extend through the plate 200, and reactant plenums 215a, 215b, which are formed on active surface 260 of plate 200. FIG. 2B depicts the oppositely facing non-active surface 270 of separator plate 200. FIG. 2B shows how backfeed ports 230a, 230b are fluidly connected to reactant backfeed channels 220a, 220b, respectively, which in turn are fluidly connected to supply and exhaust reactant manifold openings 205a, 205b. Accordingly, taken collectively, reactant plenums 215a, 215b, backfeed ports 230a, 230b, and backfeed channels 220a, 220b comprise reactant supply/exhaust passageways fluidly connecting flow field channels 210 to supply and exhaust manifold openings 205a, 205b.

Adjoining pairs of separator plates may be configured in a similar manner. Thus, in a fuel cell stack, supply and exhaust reactant manifold openings 205c, 205d may be fluidly connected to the active surface of an adjoining separator plate via analogous backfeed channels 220c, 220d (not shown) and backfeed ports 230c, 230d (not shown) formed in that adjoining plate.

As shown in FIG. 2B, multiple coolant flow field channels 250 are also formed on the non-active surface 270 of plate 200. Thus, channels for both reactants and for a coolant traverse a portion of the non-active surface 270 of plate 200. The illustrated coolant channels 250 are suitable for an open cooling system which uses air as the coolant. For example, cooling air may be blown through the channels by a fan or blower. For low power fuel cells, such as portable units, it may be possible to operate a fuel cell stack without a fan by relying only on the transfer of heat from the surfaces of cooling channels 250 to the ambient air. Alternatively, a closed cooling system (not shown), which typically employs stack coolant manifolds (which could be internal, edge or external manifolds) fluidly connected to an array of coolant channels, could be utilized.

Figure 3A:
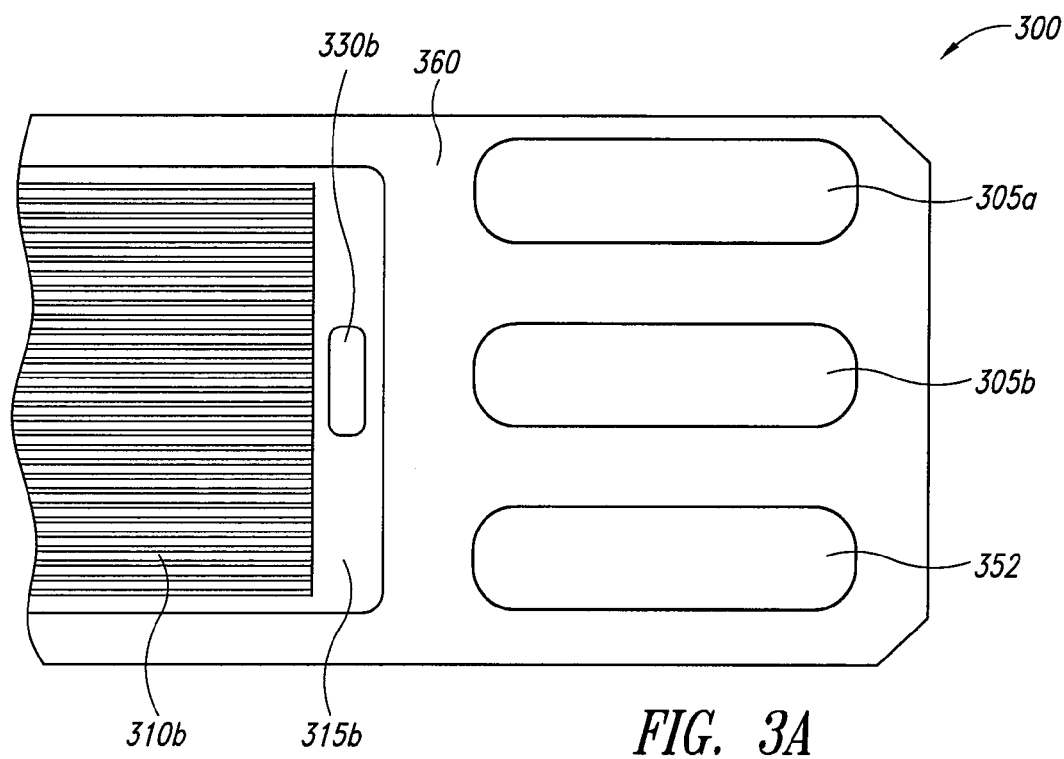
FIGS. 3A and 3B are partial plan views of the active and non-active surfaces, respectively, of a separator plate of a conventional electrochemical fuel cell stack having end reactant manifolds.
Figure 3B:
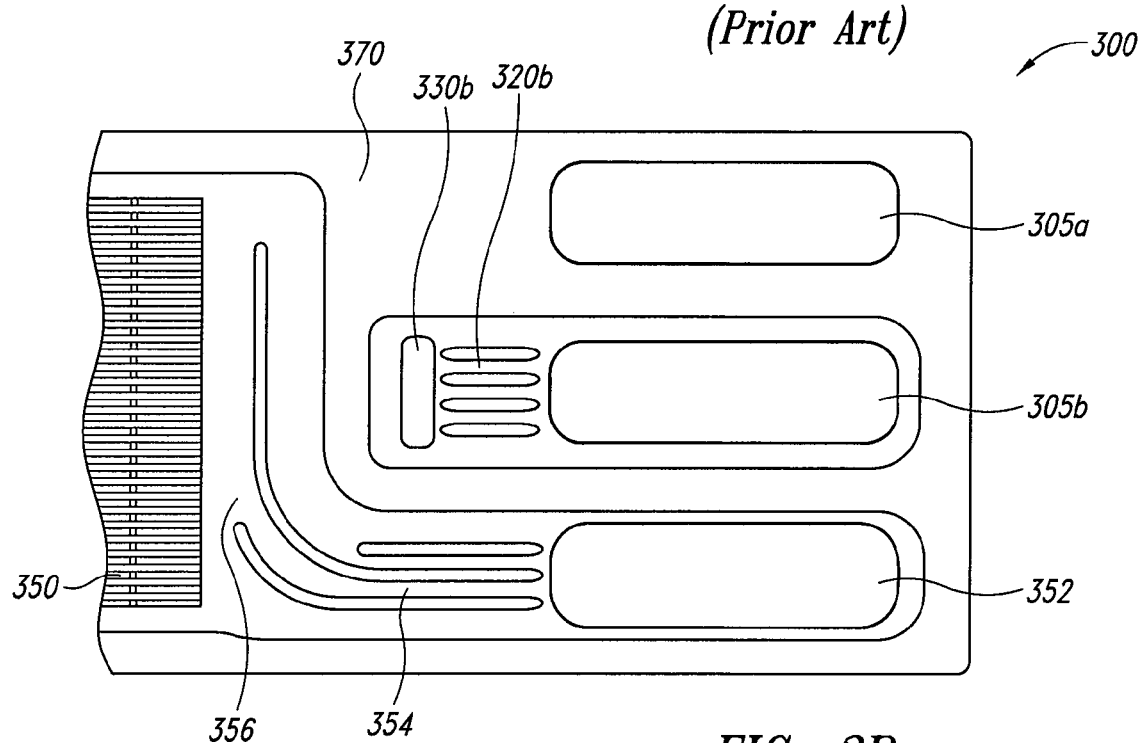

FIGS. 3A and 3B are partial plan views of the active 360 and non-active 370 surfaces, respectively, of a separator plate 300 of a conventional electrochemical fuel cell stack having end reactant manifolds (i.e., manifolds positioned along the edge of the plate perpendicular to the direction of the flow field channels). As shown, separator plate 300 has openings extending therethrough, namely, reactant supply manifold openings 305a, 305b and coolant supply manifold opening 352, which, when assembled into a fuel cell stack, form end reactant and coolant supply manifolds extending through the stack. In more specific embodiments, for example, reactant supply manifold opening 305a may be a fuel supply manifold opening, and reactant supply manifold opening 305b may be an oxidant supply manifold opening.

FIG. 3A depicts the active surface 360 of reactant plate 300 which, in a fuel cell stack, faces a MEA. Linear parallel reactant flow field channels 310b distribute a reactant stream, such as, for example, an oxidant stream, to the contacted electrode of the MEA. Reactant flow field channels 310b may comprise one or more continuous or discontinuous channels. The reactant stream is supplied to reactant flow field channels 310b from the oppositely facing non-active surface 370 of plate 300 via reactant supply backfeed port 330b, which extends through plate 300, and reactant supply plenum 315b, formed on active surface 360 of plate 300. Reactant supply plenum 315b thus acts as a transition region for the reactant supply provided from backfeed port 330b to the reactant flow field channels 310b in the reactant plate. FIG. 3B depicts the oppositely facing non-active surface 370 of separator plate 300. FIG. 3B shows how reactant supply backfeed port 330b is fluidly connected to reactant supply backfeed channels 320b, which in turn are fluidly connected to reactant supply manifold opening 305b. Accordingly, taken collectively, reactant supply plenum 315b, reactant supply backfeed port 330b, and reactant supply backfeed channels 320b comprise reactant supply passageways fluidly connecting reactant flow field channels 310b to reactant supply manifold opening 305b.

As mentioned with respect to FIGS. 2A and 2B above, adjoining pairs of separator plates may be configured in a similar manner. Thus, in a stack, reactant supply manifold opening 305a may be fluidly connected to reactant flow field channels 310a (not shown) formed on the active surface of an adjoining separator plate via analogous reactant supply backfeed channels 320a, reactant supply backfeed port 330a, and reactant supply plenum 315a formed in that adjoining plate.

As further shown in FIG. 3B, a plurality of coolant flow field channels 350 are also formed on the non-active surface 370 of plate 300. Coolant flow field channels 350 are fluidly connected to coolant supply manifold opening 352 via coolant supply passageways comprising coolant supply plenum 356 and coolant supply backfeed channels 354, also formed on the non-active surface 370 of plate 300.

Figure 4:
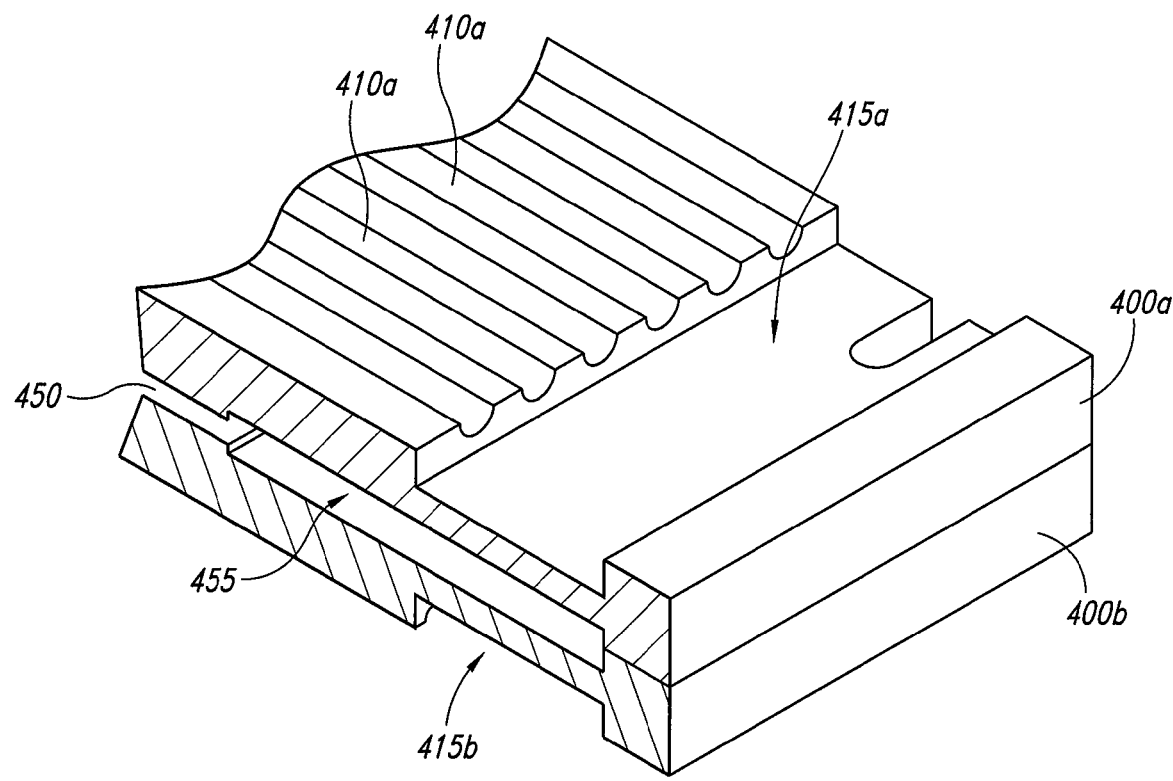
FIG. 4 is a partial three-dimensional section view of a pair of separator plates of a conventional electrochemical fuel cell stack.

When a plurality of the separator plates of FIGS. 2A-2B (in embodiments having internal or edge coolant manifolds) and FIGS. 3A-3B are assembled into a fuel cell stack with a plurality of similarly designed adjoining plates, the reactant supply and exhaust passageways and the reactant flow field channels, as well as any coolant flow field channels and coolant supply and exhaust passageways, will be stacked on top of one another in the direction perpendicular to the plane of the fuel cells. FIG. 4, which shows a partial three-dimensional section view of a pair of separator plates 400a, 400b of a conventional electrochemical fuel cell stack, illustrates such an arrangement. As shown, reactant plenums 415a, 415b are stacked on either side of coolant passageway 455 (which may comprise a coolant plenum region and coolant backfeed channels, not specifically shown, similar to the embodiment of FIGS. 3A and 3B). In addition, reactant channels 410a, 410b (not shown) are stacked on either side of coolant passageway 455 and coolant flow fields 450.

As one of skill in the art will appreciate, the minimum fuel cell thickness (and corresponding maximum stack power density) achievable with such a "stacked" arrangement is limited. Each of the fluid plenums (reactants and coolant) requires a certain volume to reduce flowsharing to acceptable levels and adequately distribute the fluid streams to the corresponding flow field channels. In order to provide adequate plenum volumes, the length (dimension parallel to the flow field channels), width (dimension perpendicular to the flow field channels) and/or depth (dimension perpendicular to the plane of the fuel cell) of the plenums may be varied. However, changes to these dimensions are constrained by the dimensions of the fuel cell plates in conventional fuel cell stacks. As one of skill in the art will appreciate, increasing the depth of the plenums by a given amount will have the greatest effect on plenum volume. However, the deepest plenums that can be formed in a plate having two stacked plenums are equal to the total thickness of the plate minus one web thickness to separate the fluids, then split between the two fluids. For example, a prior art flow field plate (e.g. from Ballard Power Systems) of 0.925 mm total thickness comprises a 0.4 mm thick web, a 0.21 mm deep coolant plenum region and a 0.315 mm deep oxidant plenum region. Accordingly, as one of skill in the art will appreciate, current fuel cell designs require a balancing, or trade-off, between the overall thickness of the fuel cell assembly and the depth of the plenums.

The present invention addresses the foregoing design challenges by providing a fuel cell stack wherein, with respect to each adjoining anode plate and cathode plate in a pair of adjacent fuel cells in the stack, the fuel, oxidant and coolant plenums of the adjoining pair of anode and cathode plates are staggered such that, in the direction perpendicular to the plane of the fuel cells, the fuel, oxidant and coolant plenums do not overlap.

Figure 5A:
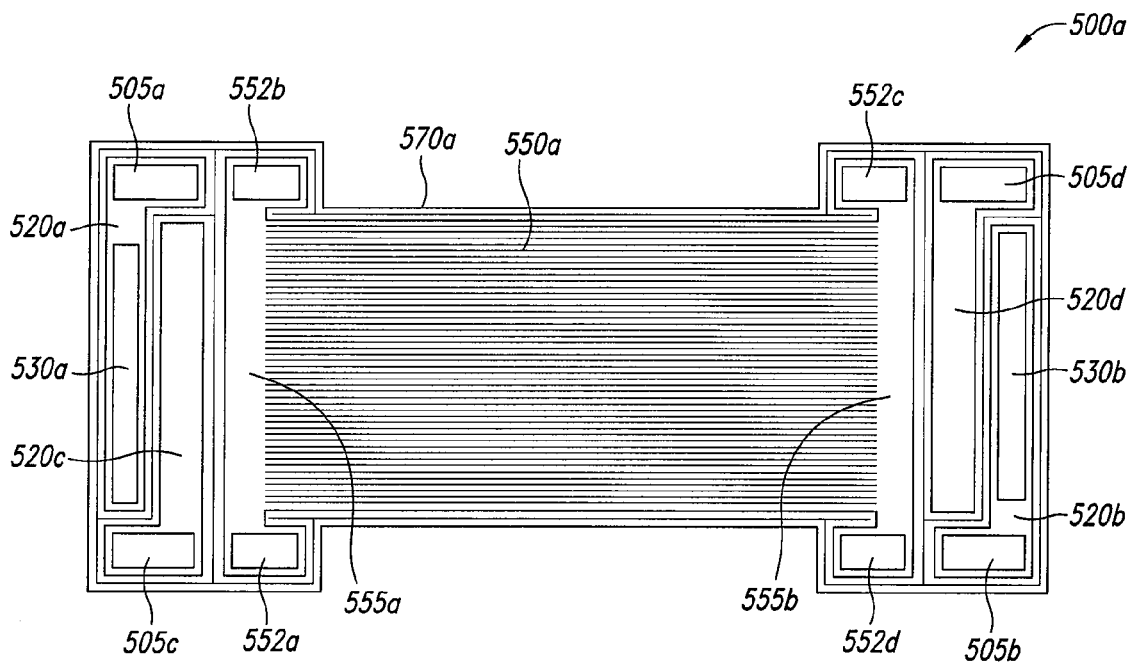
FIGS. 5A and 5B are plan views of the non-active and active surfaces, respectively, of an anode plate of an electrochemical fuel cell stack having side reactant manifolds according to a first illustrated embodiment.
Figure 5B:
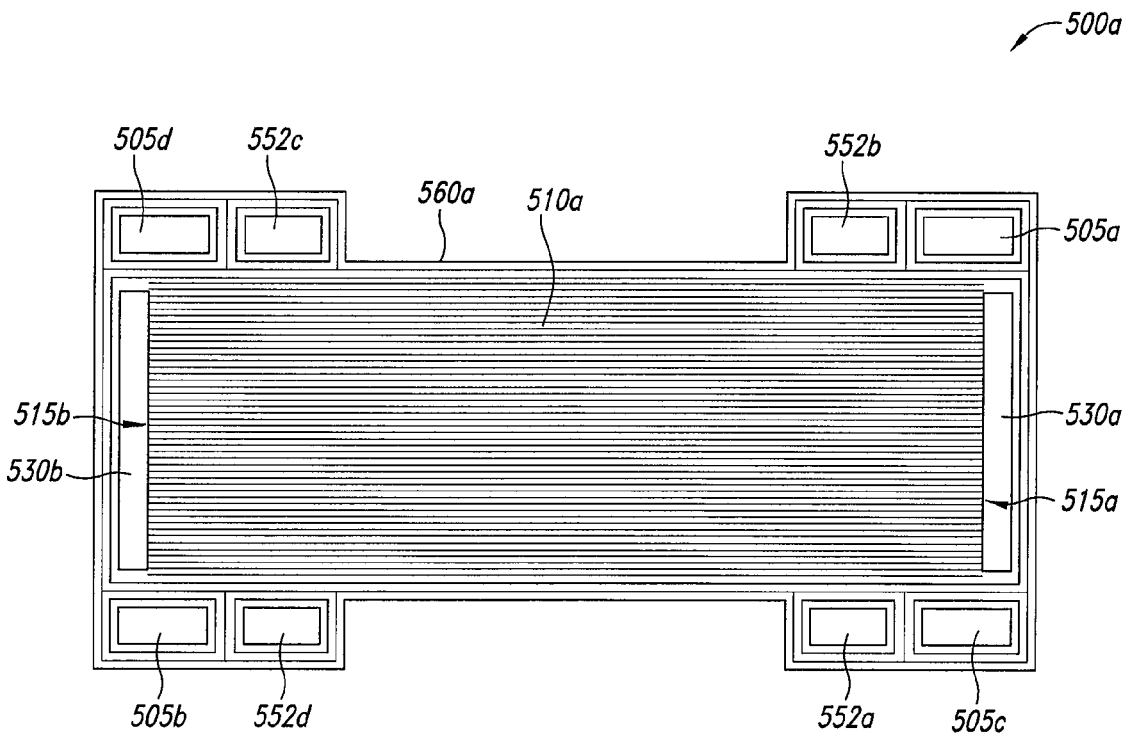
Figure 5C:
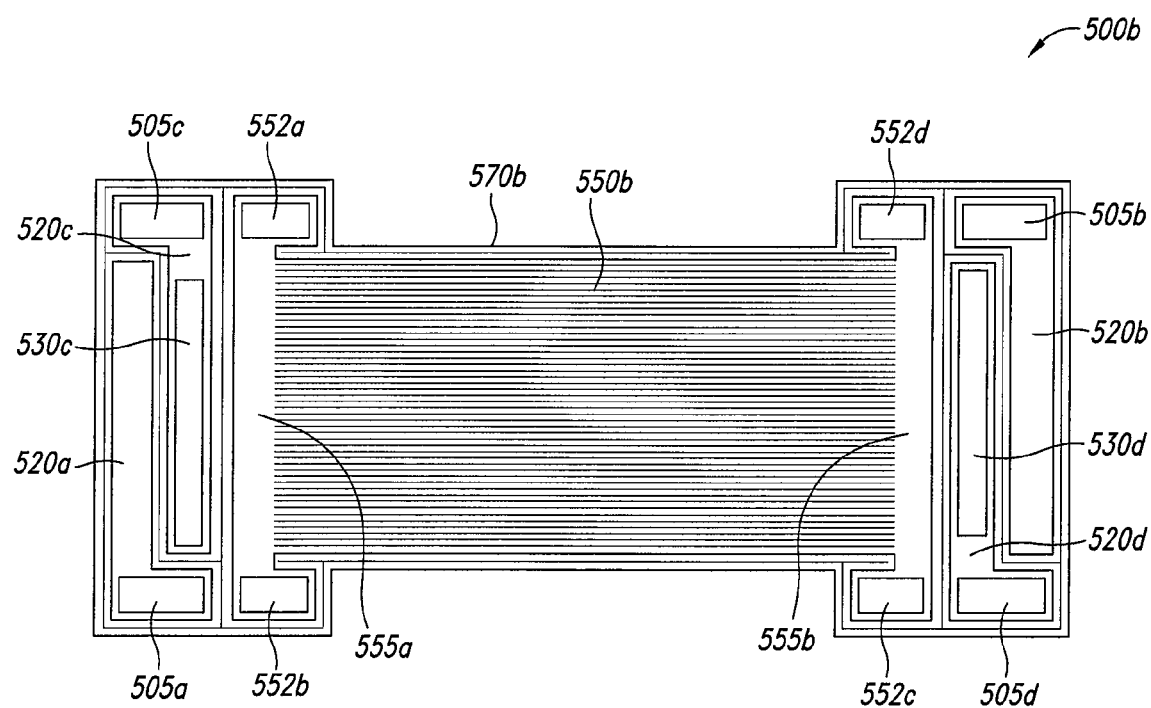
FIGS. 5C and 5D are plan views of the non-active and active surfaces, respectively, of a cathode plate of an electrochemical fuel cell stack having side reactant manifolds according to a first illustrated embodiment.
Figure 5D:
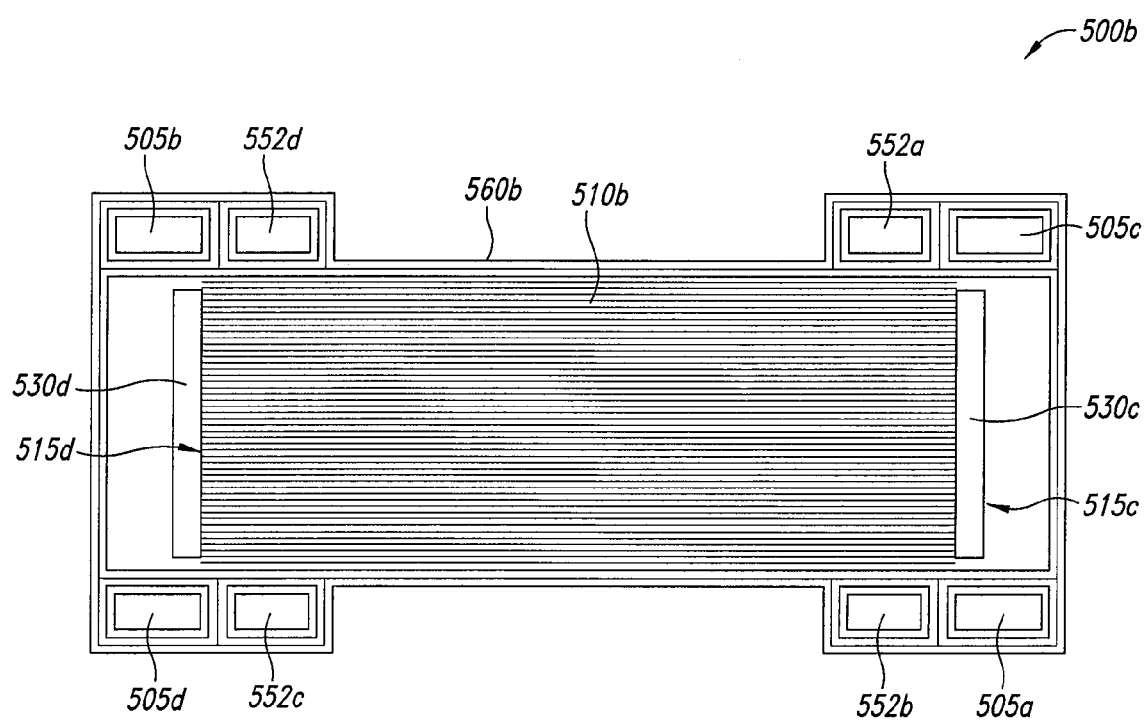

FIGS. 5A and 5B are plan views of the non-active 570$a$ and active 560$a$ surfaces, respectively, of an anode plate 500$a$ and FIGS. 5C and 5D are plan views of the non-active 570$b$ and active 560$b$ surfaces, respectively, of a cathode plate 500$b$ of an electrochemical fuel cell stack having side reactant manifolds (i.e., manifolds positioned along the edges of the plate parallel to the direction of the flow field channels) according to a first illustrated embodiment. As shown, both anode plate 500$a$ and cathode plate 500$b$ have a plurality of manifold openings extending therethrough, namely, fuel supply and exhaust manifold openings 505$a$, 505$b$ and oxidant supply and exhaust manifold openings 505$c$, 505$d$, first and second coolant supply manifold openings 552$a$, 552$b$, and first and second coolant exhaust manifold openings 552$c$, 552$d$. When a plurality of anode and cathode plates 500$a$, 500$b$ are assembled into a fuel cell stack, such manifold openings align to form side reactant and coolant supply and exhaust manifolds extending through the stack. As one of skill in the art will appreciate, in other embodiments (such as, for example, the embodiments shown in FIGS. 8 and 9), the reactant and coolant supply and exhaust manifolds may be internal manifolds, end manifolds, external manifolds, or a combination of internal, end, side and external manifolds.

FIGS. 5B and 5D depict the active surfaces 560$a$, 560$b$ of anode and cathode plates 500$a$, 500$b$, respectively. In a fuel cell stack, active surface 560$a$ of anode plate 500$a$ faces the anode of, and active surface 560$b$ of cathode plate 500$b$ faces the cathode of, a MEA disposed between the anode and cathode plates 500$a$, 500$b$ of a fuel cell. Parallel linear fuel flow field channels 510$a$ formed on the active surface 560$a$ of anode plate 500$a$ and parallel linear oxidant flow field channels 510$b$ formed on the active surface 560$b$ of cathode plate 500$b$ distribute fuel and oxidant streams, respectively, to the corresponding contacted electrodes of the MEA. In the illustrated embodiment, fuel and oxidant flow field channels 510$a$, 510$b$ comprise a plurality of continuous channels, however, in other embodiments, such flow field channels may comprise one or more continuous or discontinuous channels.

As shown in FIGS. 5A and 5B, a fuel stream is supplied to, and exhausted from, fuel flow field channels 510$a$ from the oppositely facing non-active surfaces 570$a$ of anode plate 500$a$ via fuel supply and exhaust backfeed ports 530$a$, 530$b$, respectively, each of which extends through anode plate 500$a$, and fuel supply and exhaust plenums 515$a$, 515$b$, respectively, each of which are formed on active surface 560$a$ of anode plate 500$a$. On the oppositely facing non-active surface 570$a$ of anode plate 500$a$, fuel supply and exhaust backfeed ports 530$a$, 530$b$ are fluidly connected to fuel supply and exhaust backfeed channels 520$a$, 520$b$, which in turn are fluidly connected to the fuel supply and exhaust manifolds, respectively, formed by fuel supply and exhaust manifold openings 505$a$, 505$b$. As shown in FIG. 5A, and as further discussed below, fuel supply and exhaust backfeed channels 520$a$, 520$b$ are at least partially formed on non-active surface 570$a$ of anode plate 500$a$. Accordingly, taken collectively, fuel supply and exhaust plenums 515$a$, 515$b$, fuel supply and exhaust backfeed ports 530$a$, 530$b$, and fuel supply and exhaust backfeed channels 520$a$, 520$b$ comprise fuel supply and exhaust passageways fluidly connecting fuel flow field channels 510$a$ to fuel supply and exhaust manifold openings 505$a$, 505$b$.

As shown in FIGS. 5C and 5D, an oxidant stream is supplied to, and exhausted from, oxidant flow field channels 510$b$ from the oppositely facing non-active surfaces 570$b$ of cathode plate 500$b$ via oxidant supply and exhaust backfeed ports 530$c$, 530$d$, respectively, each of which extends through cathode plate 500$a$, and oxidant supply and exhaust plenums 515$c$, 515$d$, respectively, each of which are formed on active surface 560$b$ of cathode plate 500$b$. On the oppositely facing non-active surface 570$b$ of cathode plate 500$b$, oxidant supply and exhaust backfeed ports 530$c$, 530$d$ are fluidly connected to oxidant supply and exhaust backfeed channels 520$c$, 520$d$, which in turn are fluidly connected to the oxidant supply and exhaust manifolds, respectively, formed by oxidant supply and exhaust manifold openings 505$c$, 505$d$. As shown in FIG. 5C, and as further discussed below, oxidant supply and exhaust backfeed channels 520$c$, 520$d$ are at least partially formed on non-active surface 570$b$ of cathode plate 500$b$. Accordingly, taken collectively, oxidant supply and exhaust plenums 515$c$, 515$d$, oxidant supply and exhaust backfeed ports 530$c$, 530$d$, and oxidant supply and exhaust backfeed channels 520$c$, 520$d$ comprise oxidant supply and exhaust passageways fluidly connecting oxidant flow field channels 510$b$ to oxidant supply and exhaust manifold openings 505$c$, 505$d$.

As one of skill in the art will appreciate, when a plurality of fuel cells comprising anode and cathode plates 500$a$, 500$b$ are assembled into a fuel cell stack, the non-active surface 570$a$ of the anode plate 500$a$ of each fuel cell adjoins the non-active surface 570$b$ of the cathode plate 500$b$ of one of the adjacent fuel cells and the non-active surface 570$b$ of the cathode plate 500$b$ of each fuel cell adjoins the non-active surface 570$a$ of the anode plate 500$a$ of the other adjacent fuel cell.

As shown in FIGS. 5A and 5C, fuel supply and exhaust backfeed channels 520$a$, 520$b$ are also at least partially formed on non-active surface 570$b$ of cathode plate 500$b$ and oxidant supply and exhaust backfeed channels 520$c$, 520$d$ are also at least partially formed on non-active surface 570$a$ of anode plate 500$a$. Accordingly, when a plurality of anode and cathode plates 500$a$, 500$b$ are assembled into a fuel cell stack, with the non-active surfaces 570a, 570b of each adjacent pair of anode and cathode plates 500a, 500b adjoining, the portion of fuel supply and exhaust backfeed channels 520a, 520b formed on the non-active surfaces 570b of the cathode plates 500b and the portion of fuel supply and exhaust backfeed channels 520a, 520b formed on the non-active surfaces 570a of the anode plates 500a cooperate to form fuel supply and exhaust backfeed channels 520a, 520b which traverse both non-active surfaces 570a, 570b of adjoining anode and cathode plates. Similarly, the portion of oxidant supply and exhaust backfeed channels 520c, 520d formed on the non-active surfaces 570a of the anode plates 500a and the portion of oxidant supply and exhaust backfeed channels 520c, 520d formed on the non-active surfaces 570b of the cathode plates 500b cooperate to form oxidant supply and exhaust backfeed channels 520c, 520d which traverse both non-active surfaces 570a, 570b of adjoining anode and cathode plates. By providing open-faced channels in both of the adjoining non-active surfaces, deeper reactant backfeed channels may be provided. However, as one of skill in the art will appreciate, in alternate embodiments, the reactant backfeed channels may be formed completely in either the non-active surface 570a of anode plate 500a or the non-active surface 570b of cathode plate 500b.

Furthermore, fuel supply and exhaust backfeed ports 530a, 530b and oxidant supply and exhaust backfeed ports 530c, 530d are shown as being rectangular in shape and extending along the ends of the fuel cells. In this way, fuel supply and exhaust backfeed ports 530a, 530b and oxidant supply and exhaust backfeed ports 530c, 530d span the width of fuel supply and exhaust plenums 515a, 515b and oxidant supply and exhaust plenums 515c, 515d, respectively. The backfeed ports thus occupy most of the areas of the respective plenums and thus, in this embodiment, essentially are the plenums. In other words, the backfeed ports comprise the plenums. As one of skill in the art will appreciate, in alternate embodiments, the backfeed ports may vary in shape and size. For example, the backfeed ports may be circular or oval in shape.

In the illustrated embodiment, when a plurality of fuel cells comprising anode and cathode plates 500a, 500b are assembled into a fuel cell stack, the fuel and oxidant supply and exhaust plenums of each adjoining pair of anode and cathode plates are staggered such that, in the direction perpendicular to the plane of the fuel cells, the fuel and oxidant supply and exhaust plenums do not overlap. And, the reactant backfeed channels are formed on both non-active surfaces of adjoining anode and cathode plates and the reactant backfeed ports span the width of the reactant plenums.

Figure 5E:
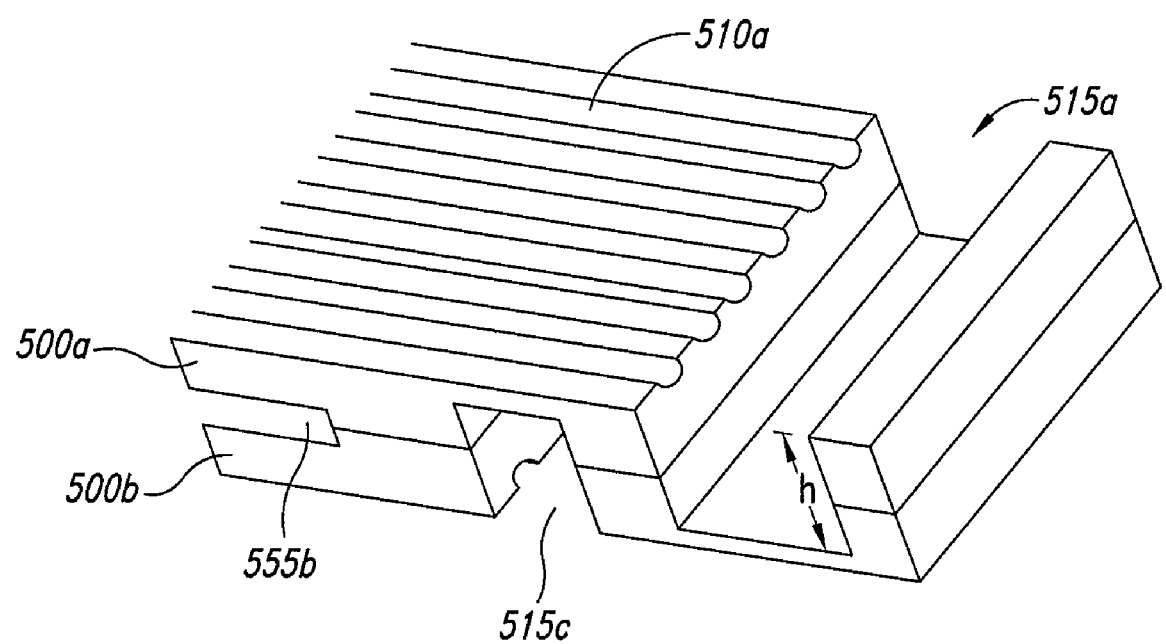
FIG. 5E is a partial three-dimensional section view of an electrochemical fuel cell stack comprising the anode and cathode separator plates of FIGS. 5A-D.

FIG. 5E is a partial three-dimensional section view of an electrochemical fuel cell stack comprising anode and cathode separator plates 500a and 500b respectively. In particular, FIG. 5E shows the relative locations of fuel supply plenum 515a, oxidant supply plenum 515c, and coolant exhaust plenum 555b. Fuel supply plenum 515a and oxidant supply plenum 515c are staggered in the direction perpendicular to the plane of the fuel cells and thus can be deeper than prior art plenums.

In this way, the illustrated embodiment eliminates the constraints regarding the depth of certain elements of the reactant passageways, such as the reactant plenums, encountered in conventional fuel cell stack designs. For instance, the total height (h) (shown in FIG. 5E) of the fuel supply plenum plus the fuel supply backfeed channel (or alternatively, the fuel exhaust plenum plus the fuel exhaust backfeed channel) can be greater than the thickness of the anode plate. In a like manner, the total height of the oxidant supply plenum plus the oxidant supply backfeed channel (or alternatively, the oxidant exhaust plenum plus the oxidant exhaust backfeed channel) can be greater than the thickness of the cathode plate. This is a substantial increase over the depth of the reactant plenums in a conventional fuel cell stack.

In the illustrated embodiment, the fuel and oxidant manifolds are positioned on opposing sides of the fuel cells and the fuel and oxidant exhaust manifolds are positioned on opposing sides of the fuel cells. Furthermore, in the illustrated embodiment, the fuel supply and exhaust manifolds are positioned on opposing sides of the fuel cells and the oxidant supply and exhaust manifolds are positioned on opposing sides of the fuel cells, thereby yielding a Z-shaped reactant flow (as further described with respect to FIG. 10A below). As one of skill in the art will appreciate, in alternate embodiments, the fuel supply and exhaust manifolds may be positioned on the same side of the fuel cells and the oxidant supply and exhaust manifolds may be positioned on the same side of the fuel cells, thereby yielding a U-shaped reactant flow (as further described with respect to FIG. 10B below).

As further shown in FIGS. 5A and 5C, a plurality of coolant flow field channels 550a, 550b are also formed on non-active surfaces 570a, 570b of anode and cathode plates 500a, 500b, respectively. Coolant flow field channels 550a, 550b are fluidly connected to the first and second coolant supply manifolds, formed by first and second coolant supply manifold openings 552a, 552b via coolant supply plenum 555a formed on the non-active surfaces 570a, 570b of anode and cathode plates 500a, 500b. Coolant flow field channels 550a, 550b are also fluidly connected to the first and second coolant exhaust manifolds, formed by first and second coolant exhaust manifold openings 552c, 552d via coolant exhaust plenum 555b formed on the non-active surfaces 570a, 570b of anode and cathode plates 500a, 500b. As shown, when a plurality of fuel cells comprising anode and cathode plates 500a, 500b are assembled into a fuel cell stack, the coolant supply and exhaust plenums and the fuel and oxidant supply and exhaust plenums of each adjoining pair of anode and cathode plates are staggered such that, in the direction perpendicular to the plane of the fuel cells, the fuel, oxidant and coolant supply and exhaust plenums do not overlap.

By comprising two coolant supply manifolds and two coolant exhaust manifolds, the illustrated embodiment allows a split coolant flow field to be designed which can be run in two or more modes to impose different thermal gradients across the width and/or length of the fuel cells. For example, during start-up, a reduced coolant flow could be provided by utilizing only the first coolant supply and exhaust manifolds. As the fuel cell stack began to heat, the second coolant supply and exhaust manifolds could be utilized to provide additional cooling as necessary. During shut-down, second coolant supply and exhaust manifolds could be closed prior to first coolant supply and exhaust manifolds to impart thermal gradients to the fuel cells to drive any accumulated liquid water to certain areas of the fuel cells. However, as one of skill in the art will appreciate, dual coolant manifolds are not required and, in alternate embodiments (such as, for example, the embodiment of FIGS. 7A-7D below), only one coolant supply manifold and one coolant exhaust manifold may be provided.

Figure 6A:
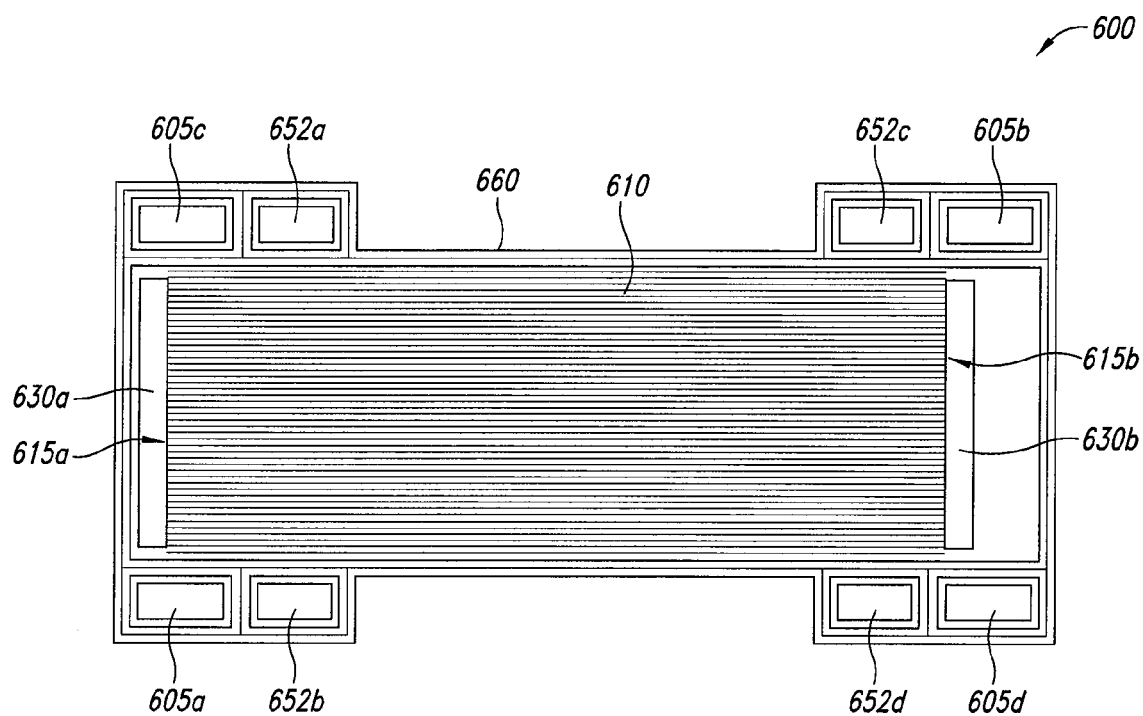
FIGS. 6A and 6B are plan views of the active and non-active surfaces, respectively, of a reactant plate of an electrochemical fuel cell stack having side reactant manifolds according to a second illustrated embodiment.
Figure 6B:
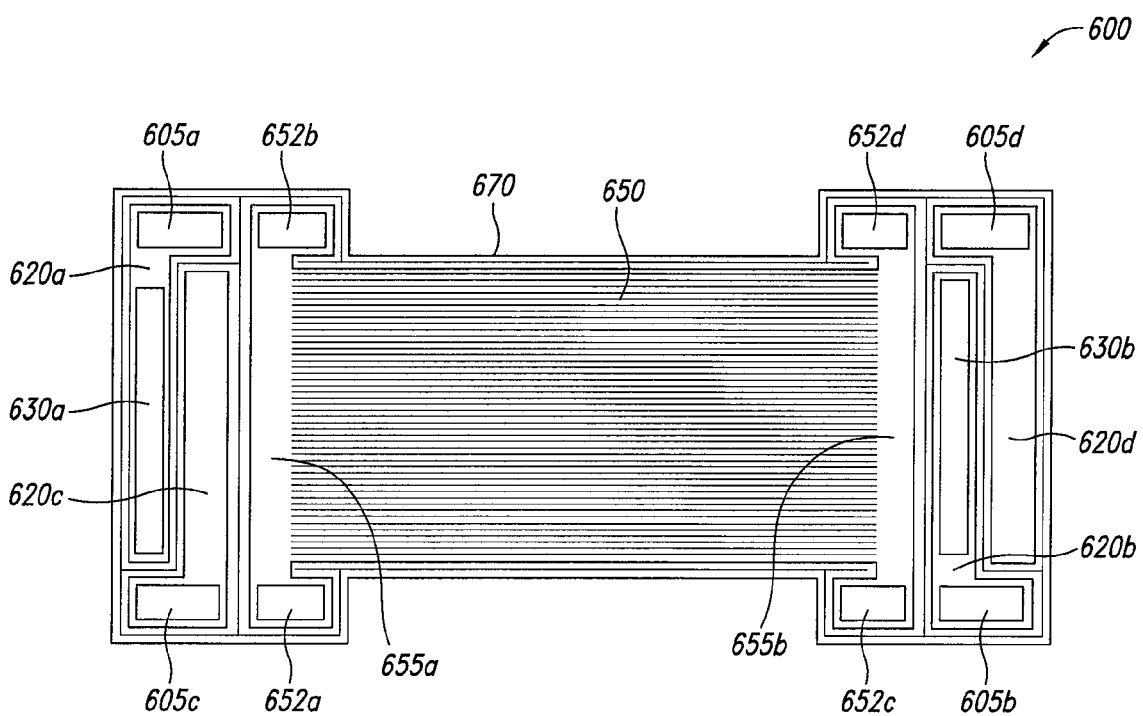

FIGS. 6A and 6B are plan views of the active 660 and non-active 670 surfaces, respectively, of a reactant plate 600 of an electrochemical fuel cell stack having side reactant manifolds according to a second illustrated embodiment. The embodiment of FIGS. 6A and 6B is designed to provide a single repeating plate that can be used as both the anode and cathode plate in a fuel cell, thereby reducing manufacturing complexity and cost. As one of skill in the art will appreciate, such a repeating plate may be utilized in fuel cell stacks operating under conditions in which the same flow field geometry (e.g., port size, flow field channel size, etc . . . ) may be utilized for both reactants.

For purposes of illustration, reactant plate 600 will be described as an anode plate, however, as one of skill the art will appreciate, reactant plate 600 may also be utilized as a cathode plate. Accordingly, in the following description, anode/fuel and cathode/oxidant elements are intended to be interchangeable. In particular, as one of skill in the art will appreciate, the elements identified as anode elements in the following description will serve as the cathode components in an adjacent reactant plate in a fuel cell stack.

As shown, anode plate 600 has a plurality of manifold openings extending therethrough, namely, fuel supply and exhaust manifold openings 605a, 605b and oxidant supply and exhaust manifold openings 605c, 605d, first and second coolant supply manifold openings 652a, 652b, and first and second coolant exhaust manifold openings 652c, 652d. When a plurality of anode plates 600 are assembled into a fuel cell stack with corresponding cathode plates, such manifold openings align to form side reactant and coolant supply and exhaust manifolds extending through the stack. As one of skill in the art will appreciate, in other embodiments, the reactant and coolant supply and exhaust manifolds may be internal manifolds, end manifolds, external manifolds, or a combination of internal, end, side and external manifolds.

FIG. 6A depicts the active surface 660 of anode plate 600. In a fuel cell stack, active surface 660 of anode plate 600 faces the anode of a MEA disposed between anode plate 600 and the cathode plate of the fuel cell. Linear parallel fuel flow field channels 610 formed on the active surface 660 of anode plate 600 distribute a fuel stream to the contacted electrode of the MEA. In the illustrated embodiment, fuel flow field channels 610 comprise a plurality of continuous channels, however, in other embodiments, such flow field channels may comprise one or more continuous or discontinuous channels.

As shown in FIGS. 6A and 6B, a fuel stream is supplied to, and exhausted from, fuel flow field channels 610 from the oppositely facing non-active surface 670 of anode plate 600 via fuel supply and exhaust backfeed ports 630a, 630b, respectively, each of which extends through anode plate 600, and fuel supply and exhaust plenums 615a, 615b, respectively, each of which are formed on active surface 660 of anode plate 600. On the oppositely facing non-active surface 670 of anode plate 600, fuel supply and exhaust backfeed ports 630a, 630b are fluidly connected to fuel supply and exhaust backfeed channels 620a, 620b, which in turn are fluidly connected to the fuel supply and exhaust manifolds, respectively, formed by fuel supply and exhaust manifold openings 605a, 605b. As shown in FIG. 6B, and as further discussed below, fuel supply and exhaust backfeed channels 620a, 620b are at least partially formed on non-active surface 670 of anode plate 600. Accordingly, taken collectively, fuel supply and exhaust plenums 615a, 615b, fuel supply and exhaust backfeed ports 630a, 630b, and fuel supply and exhaust backfeed channels 620a, 620b comprise fuel supply and exhaust passageways fluidly connecting fuel flow field channels 610 to fuel supply and exhaust manifold openings 605a, 605b.

As mentioned above, adjoining pairs of separator plates may be configured the same. Thus, in a fuel cell stack, oxidant supply and exhaust manifold openings 605c, 605d may be fluidly connected to oxidant flow fields (not shown) formed on the active surface of an adjoining separator plate via analogous oxidant supply and exhaust passageways comprising oxidant supply and exhaust backfeed channels (partially shown as 620c, 620d in FIG. 6B), oxidant supply and exhaust backfeed ports (not shown), and oxidant supply and exhaust plenums (not shown) formed in that adjoining plate.

Although not illustrated, similar to the embodiment of FIGS. 5A-5D, anode supply and exhaust backfeed channels 620a, 620b are also at least partially formed on the non-active surface of the adjoining cathode plate and the oxidant supply and exhaust backfeed channels 620c, 620d are also at least partially formed on non-active surface 670 of anode plate 600. Accordingly, when a plurality of anode plates 600 and corresponding cathode plates are assembled into a fuel cell stack, with the non-active surfaces of each adjacent pair of anode and cathode plates adjoining, the portion of fuel supply and exhaust backfeed channels 620a, 620b formed on the non-active surfaces of the cathode plates and the portion of fuel supply and exhaust backfeed channels 620a, 620b formed on the non-active surfaces 670 of the anode plates 600 cooperate to form fuel supply and exhaust backfeed channels 620a, 620b which traverse both non-active surfaces of adjoining anode and cathode plates. Similarly, the portion of oxidant supply and exhaust backfeed channels 620c, 620d formed on the non-active surfaces 670 of the anode plates 600 and the portion of oxidant supply and exhaust backfeed channels 620c, 620d formed on the non-active surfaces of the cathode plates cooperate to form oxidant supply and exhaust backfeed channels 620c, 620d which traverse both non-active surfaces of adjoining anode and cathode plates. By providing open-faced channels in both of the adjoining non-active surfaces, deeper reactant backfeed channels may be provided. However, as one of skill in the art will appreciate, in alternate embodiments, the reactant backfeed channels may be formed completely in either the non-active surface 670 of anode plate 600 or the non-active surfaces of the cathode plates.

Furthermore, fuel supply and exhaust backfeed ports 630a, 630b are shown as being rectangular in shape and extending along the ends of the fuel cells. In this way, fuel supply and exhaust backfeed ports 630a, 630b span the width of fuel supply and exhaust plenums 615a, 615b, respectively. Oxidant supply and exhaust backfeed ports (not shown) may be configured similarly. As one of skill in the art will appreciate, in alternate embodiments, the backfeed ports may vary in shape and size. For example, the backfeed ports may be circular or oval in shape.

In the illustrated embodiment, when a plurality of fuel cells comprising anode plates 600 and corresponding cathode plates are assembled into a fuel cell stack, the fuel and oxidant supply and exhaust plenums of each adjoining pair of anode and cathode plates are staggered such that, in the direction perpendicular to the plane of the fuel cells, the fuel and oxidant supply and exhaust plenums do not overlap. In this way, the illustrated embodiment eliminates the constraints regarding the depth of certain elements of the reactant passageways, such as the reactant plenums, encountered in conventional fuel cell stack designs.

Unlike the embodiment of FIGS. 5A-5D, in the embodiment of FIGS. 6A and 6B, only the fuel supply plenum is positioned outside of the oxidant supply plenum in the direction perpendicular to the reactant flow field channels. This is necessary to provide the required symmetry to reactant plate 600 enabling reactant plate 600 to be utilized as both the anode and cathode plate in a fuel cell stack.

Similar to FIGS. 5A-5D, in the illustrated embodiment, the fuel and oxidant manifolds are positioned on opposing sides of the fuel cells and the fuel and oxidant exhaust manifolds are positioned on opposing sides of the fuel cells. Furthermore, the fuel supply and exhaust manifolds are positioned opposing sides of the fuel cells and the oxidant supply and exhaust manifolds are positioned on opposing sides of the fuel cells, thereby yielding a Z-shaped reactant flow (as further described with respect to FIG. 10A below). Again, this configuration is necessary to provide the required symmetry to reactant plate 600.

As further shown in FIG. 6B, a plurality of coolant flow field channels 650 are also formed on non-active surface 670 of anode plate 600. Coolant flow field channels 650 are fluidly connected to the first and second coolant supply manifolds, formed by first and second coolant supply manifold openings 652a, 652b via coolant supply plenum 655a formed on the non-active surface 670 of anode plate 600 and the non-active surface of the adjoining cathode plate. Coolant flow field channels 650 are also fluidly connected to the first and second coolant exhaust manifolds, formed by first and second coolant exhaust manifold openings 652c, 652d via coolant exhaust plenum 655b formed on the non-active surface 670 of anode plate 600 and the non-active surface of the adjoining cathode plate. When a plurality of fuel cells comprising anode plates 600 and corresponding cathode plates are assembled into a fuel cell stack, the coolant supply and exhaust plenums and the fuel and oxidant supply and exhaust plenums of each adjoining pair of anode and cathode plates are staggered such that, in the direction perpendicular to the plane of the fuel cells, the fuel, oxidant and coolant supply and exhaust plenums do not overlap.

Similar to the embodiment of FIGS. 5A-5D, by comprising two coolant supply manifolds and two coolant exhaust manifolds, the illustrated embodiment allows a split coolant flow field to be designed which can be run in two or more modes to impose different thermal gradients across the width and/or length of the fuel cells. For example, during start-up, a reduced coolant flow could be provided by utilizing only the first coolant supply and exhaust manifolds. As the fuel cell stack began to heat, the second coolant supply and exhaust manifolds could be utilized to provide additional cooling as necessary. During shut-down, second coolant supply and exhaust manifolds could be closed prior to first coolant supply and exhaust manifolds to impart thermal gradients to the fuel cells to drive any accumulated liquid water to certain areas of the fuel cells. However, as one of skill in the art will appreciate, dual coolant manifolds are not required and, in alternate embodiments (such as, for example, the embodiment of FIGS. 7A-7D below), only one coolant supply manifold and one coolant exhaust manifold may be provided.

Figure 7A:
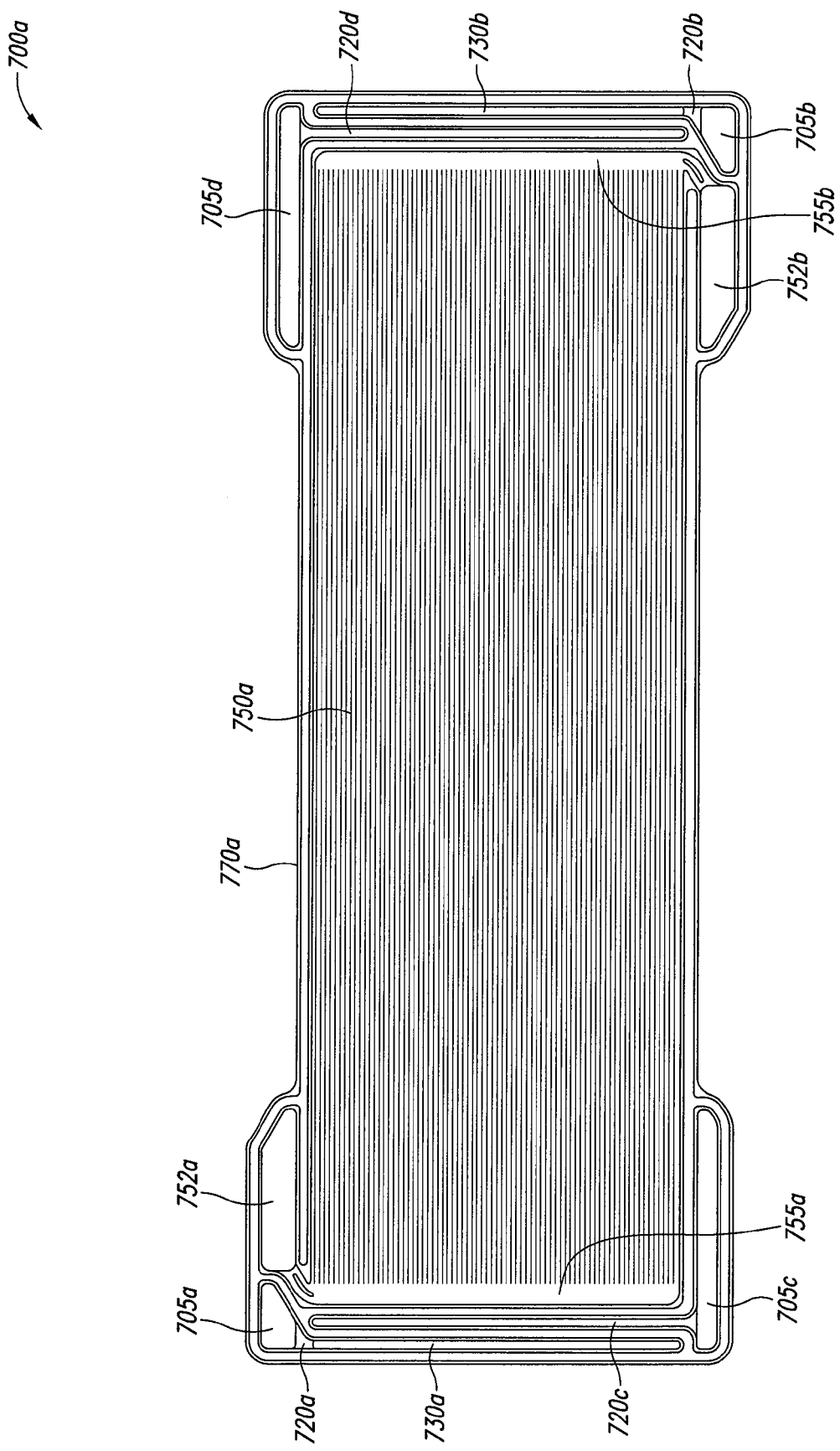
FIGS. 7A and 7B are plan views of the non-active and active surfaces, respectively, of an anode plate of an electrochemical fuel cell stack having side reactant manifolds according to a third illustrated embodiment.
Figure 7B:
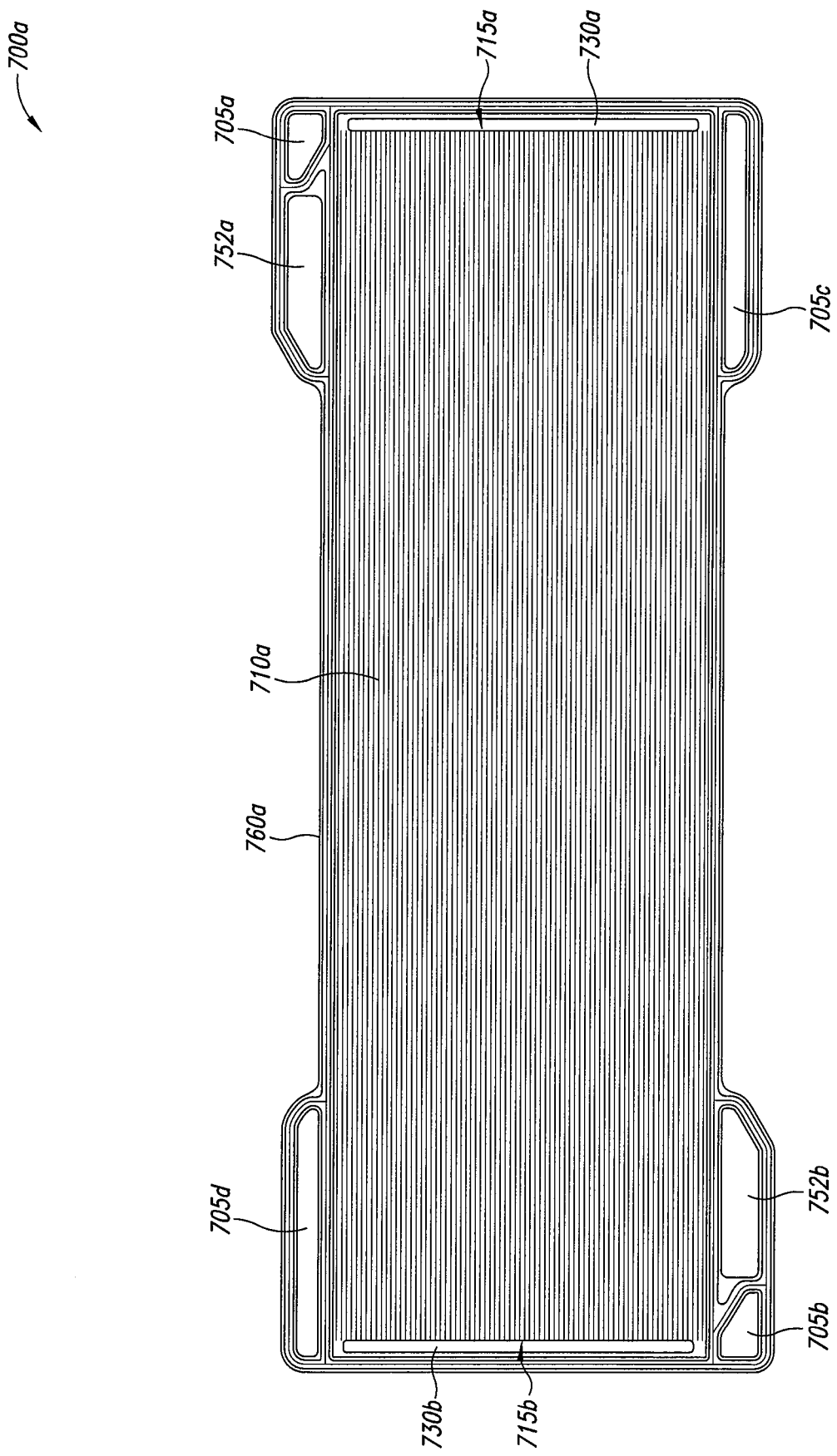
Figure 7C:
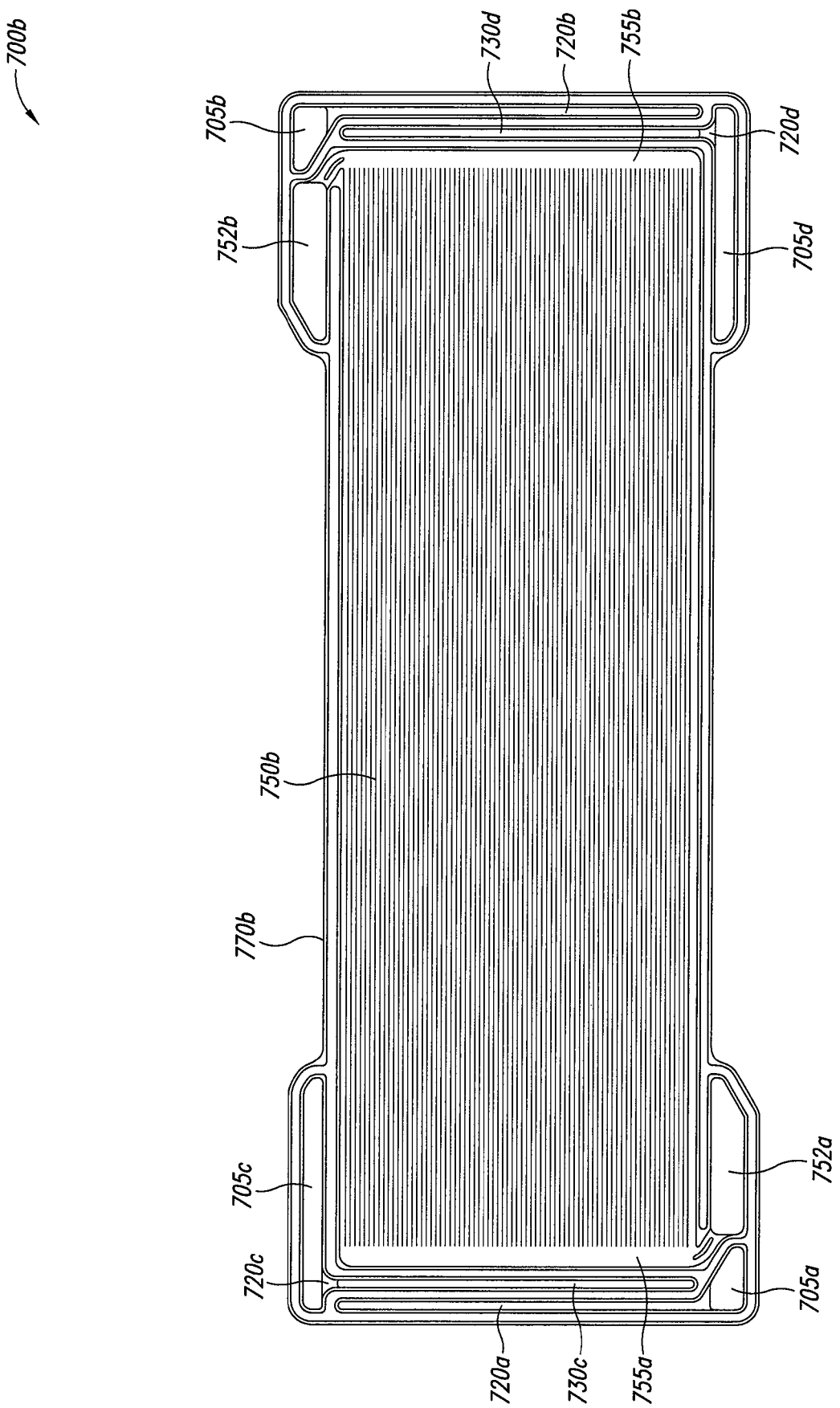
FIGS. 7C and 7D are plan views of the non-active and active surfaces, respectively, of a cathode plate of an electrochemical fuel cell stack having side reactant manifolds according to a third illustrated embodiment.
Figure 7D:
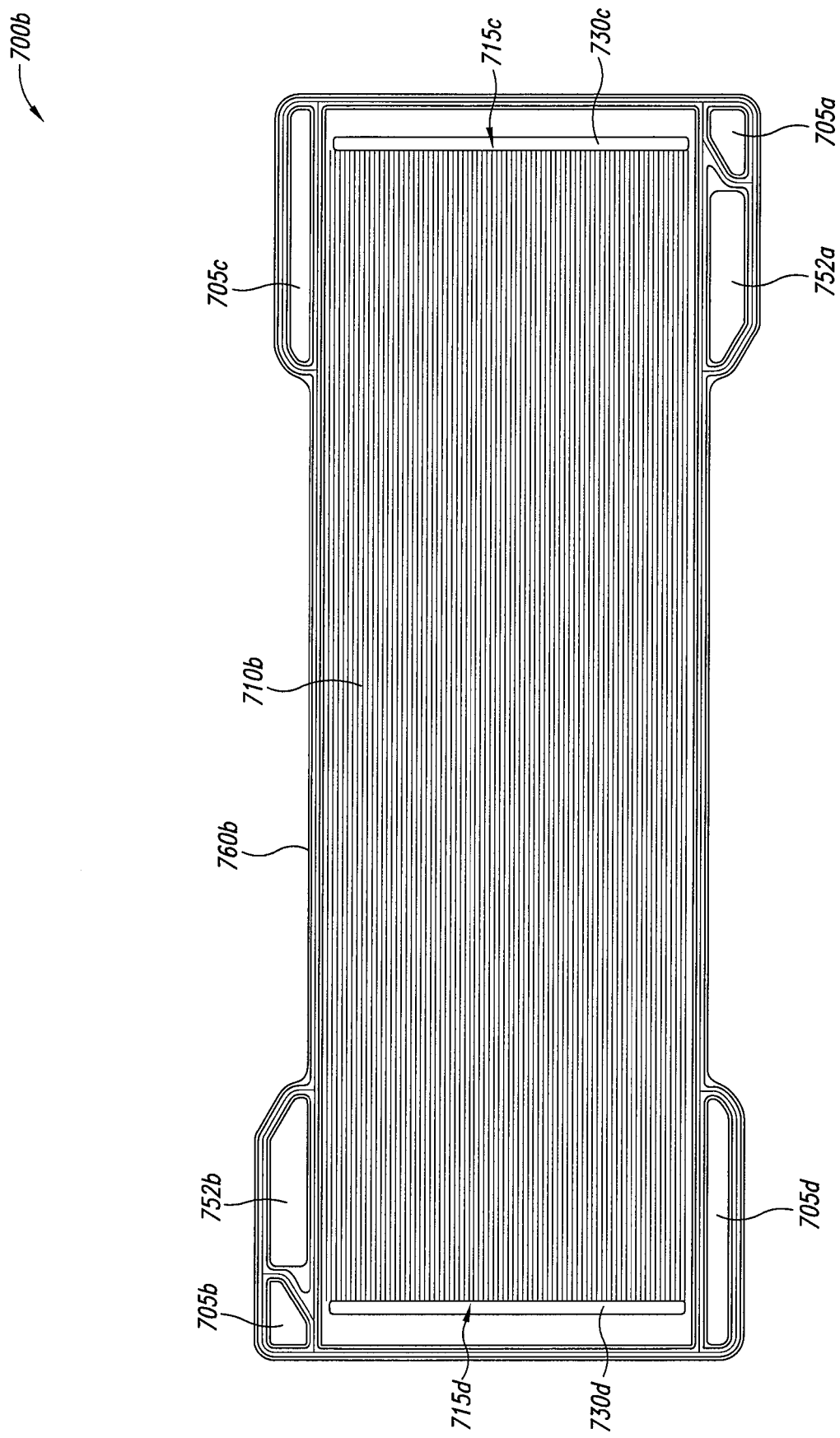

FIGS. 7A and 7B are plan views of the non-active 770a and active 760a surfaces, respectively, of an anode plate 700a and FIGS. 7C and 7D are plan views of the non-active 770b and active 760b surfaces, respectively, of a cathode plate 700b of an electrochemical fuel cell stack having side reactant manifolds according to a third illustrated embodiment. As shown, both anode plate 700a and cathode plate 700b have a plurality of manifold openings extending therethrough, namely, fuel supply and exhaust manifold openings 705a, 705b and oxidant supply and exhaust manifold openings 705c, 705d, first coolant supply manifold opening 752a and first coolant exhaust manifold opening 752b. When a plurality of anode and cathode plates 700a, 700b are assembled into a fuel cell stack, such manifold openings align to form side reactant and coolant supply and exhaust manifolds extending through the stack. As one of skill in the art will appreciate, in other embodiments (such as, for example, the embodiments shown in FIGS. 8 and 9), the reactant and coolant supply and exhaust manifolds may be internal manifolds, end manifolds, external manifolds, or a combination of internal, end, side and external manifolds.

FIGS. 7B and 7D depict the active surfaces 760a, 760b of anode and cathode plates 700a, 700b, respectively. In a fuel cell stack, active surface 760a of anode plate 700a faces the anode of, and active surface 760b of cathode plate 700b faces the cathode of, a MEA disposed between the anode and cathode plates 700a, 700b of a fuel cell. Fuel flow field channels 710a formed on the active surface 760a of anode plate 700a and oxidant flow field channels 710b formed on the active surface 760b of cathode plate 700b distribute fuel and oxidant streams, respectively, to the corresponding contacted electrodes of the MEA. In the illustrated embodiment, fuel and oxidant flow field channels 710a, 710b comprise a plurality of continuous channels, however, in other embodiments, such flow field channels may comprise one or more continuous or discontinuous channels.

As shown in FIGS. 7A and 7B, a fuel stream is supplied to, and exhausted from, fuel flow field channels 710a from the oppositely facing non-active surfaces 770a of anode plate 700a via fuel supply and exhaust backfeed ports 730a, 730b, respectively, each of which extends through anode plate 700a, and fuel supply and exhaust plenums 715a, 715b, respectively, each of which are formed on active surface 760a of anode plate 700a. On the oppositely facing non-active surface 770a of anode plate 700a, fuel supply and exhaust backfeed ports 730a, 730b are fluidly connected to fuel supply and exhaust backfeed channels 720a, 720b, which in turn are fluidly connected to the fuel supply and exhaust manifolds, respectively, formed by fuel supply and exhaust manifold openings 705a, 705b. As shown in FIG. 7A, and as further discussed below, fuel supply and exhaust backfeed channels 720a, 720b are at least partially formed on non-active surface 770a of anode plate 700a. Accordingly, taken collectively, fuel supply and exhaust plenums 715a, 715b, fuel supply and exhaust backfeed ports 730a, 730b, and fuel supply and exhaust backfeed channels 720a, 720b comprise fuel supply and exhaust passageways fluidly connecting fuel flow field channels 710a to fuel supply and exhaust manifold openings 705a, 705b.

As shown in FIGS. 7C and 7D, an oxidant stream is supplied to, and exhausted from, oxidant flow field channels 710b from the oppositely facing non-active surfaces 770b of cathode plate 700b via oxidant supply and exhaust backfeed ports 730c, 730d, respectively, each of which extends through cathode plate 700a, and oxidant supply and exhaust plenums 715c, 715d, respectively, each of which are formed on active surface 760b of cathode plate 700b. On the oppositely facing non-active surface 770b of cathode plate 700b, oxidant supply and exhaust backfeed ports 730c, 730d are fluidly connected to oxidant supply and exhaust backfeed channels 720c, 720d, which in turn are fluidly connected to the oxidant supply and exhaust manifolds, respectively, formed by oxidant supply and exhaust manifold openings 705c, 705d. As shown in FIG. 7C, and as further discussed below, oxidant supply and exhaust backfeed channels 720c, 720d are at least partially formed on non-active surface 770b of cathode plate 700b. Accordingly, taken collectively, oxidant supply and exhaust plenums 715c, 715d, oxidant supply and exhaust backfeed ports 730c, 730d, and oxidant supply and exhaust backfeed channels 720c, 720d comprise oxidant supply and exhaust passageways fluidly connecting oxidant flow field channels 710b to oxidant supply and exhaust manifold openings 705c, 705d.

As one of skill in the art will appreciate, when a plurality of fuel cells comprising anode and cathode plates 700a, 700b are assembled into a fuel cell stack, the non-active surface 770a of the anode plate 700a of each fuel cell adjoins the non-active surface 770b of the cathode plate 700b of one of the adjacent fuel cells and the non-active surface 770*b* of the cathode plate 700*b* of each fuel cell adjoins the non-active surface 770*a* of the anode plate 700*a* of the other adjacent fuel cell.

As shown in FIGS. 7A and 7C, fuel supply and exhaust backfeed channels 720*a*, 720*b* are also at least partially formed on non-active surface 770*b* of cathode plate 700*b* and oxidant supply and exhaust backfeed channels 720*c*, 720*d* are also at least partially formed on non-active surface 770*a* of anode plate 700*a*. Accordingly, when a plurality of anode and cathode plates 700*a*, 700*b* are assembled into a fuel cell stack, with the non-active surfaces 770*a*, 770*b* of each adjacent pair of anode and cathode plates 700*a*, 700*b* adjoining, the portion of fuel supply and exhaust backfeed channels 720*a*, 720*b* formed on the non-active surfaces 770*b* of the cathode plates 700*b* and the portion of fuel supply and exhaust backfeed channels 720*a*, 720*b* formed on the non-active surfaces 770*a* of the anode plates 700*a* cooperate to form fuel supply and exhaust backfeed channels 720*a*, 720*b* which traverse both non-active surfaces 770*a*, 770*b* of adjoining anode and cathode plates. Similarly, the portion of oxidant supply and exhaust backfeed channels 720*c*, 720*d* formed on the non-active surfaces 770*a* of the anode plate 700*a* and the portion of oxidant supply and exhaust backfeed channels 720*c*, 720*d* formed on the non-active surfaces 770*b* of the cathode plates 700*b* cooperate to form oxidant supply and exhaust backfeed channels 720*c*, 720*d* which traverse both non-active surfaces 770*a*, 770*b* of adjoining anode and cathode plates. By providing open-faced channels in both of the adjoining non-active surfaces, deeper reactant backfeed channels may be provided. However, as one of skill in the art will appreciate, in alternate embodiments, the reactant backfeed channels may be formed completely in either the non-active surface 770*a* of anode plate 700*a* or the non-active surface 770*b* of cathode plate 700*b*.

Furthermore, fuel supply and exhaust backfeed ports 730*a*, 730*b* and oxidant supply and exhaust backfeed ports 730*c*, 730*d* are shown as being rectangular in shape and extending along the ends of the fuel cells. In this way, fuel supply and exhaust backfeed ports 730*a*, 730*b* and oxidant supply and exhaust backfeed ports 730*c*, 730*d* span the width of fuel supply and exhaust plenums 715*a*, 715*b* and oxidant supply and exhaust plenums 715*c*, 715*d*, respectively. As one of skill in the art will appreciate, in alternate embodiments, the backfeed ports may vary in shape and size. For example, the backfeed ports may be circular or oval in shape.

In the illustrated embodiment, when a plurality of fuel cells comprising anode and cathode plates 700*a*, 700*b* are assembled into a fuel cell stack, the fuel and oxidant supply and exhaust plenums of each adjoining pair of anode and cathode plates are staggered such that, in the direction perpendicular to the plane of the fuel cells, the fuel and oxidant supply and exhaust plenums do not overlap. In this way, the illustrated embodiment eliminates the constraints regarding the depth of certain elements of the reactant passageways, such as the reactant plenums, encountered in conventional fuel cell stack designs.

Similar to FIGS. 5A-5D, in the illustrated embodiment, the fuel supply and exhaust plenums are positioned outside of the oxidant supply and exhaust plenums in the direction perpendicular to the fuel and oxidant flow field channels. In this way, the illustrated embodiment reduces the possibility of starving a portion of the active area of the contacted MEA adjacent to the fuel supply and exhaust plenums where only oxidant is present. However, as one of skill in the art will appreciate, this configuration is not required and, in alternate embodiments (such as, for example, the embodiment shown in FIGS. 6A and 6B), one or neither of the fuel supply and exhaust plenums may be positioned outside of the oxidant supply and exhaust plenums.

In the illustrated embodiment, the fuel and oxidant manifolds are positioned on opposing sides of the fuel cells and the fuel and oxidant exhaust manifolds are positioned on opposing sides of the fuel cells. Furthermore, in the illustrated embodiment, the fuel supply and exhaust manifolds are positioned on opposing sides of the fuel cells and the oxidant supply and exhaust manifolds are positioned on opposing sides of the fuel cells, thereby yielding a Z-shaped reactant flow (as further described with respect to FIG. 10A below). As one of skill in the art will appreciate, in alternate embodiments, the fuel supply and exhaust manifolds may be positioned on the same side of the fuel cells and the oxidant supply and exhaust manifolds may be positioned on the same side of the fuel cells, thereby yielding a U-shaped reactant flow (as further described with respect to FIG. 10B below).

As further shown in FIGS. 7A and 7C, a plurality of coolant flow field channels 750*a*, 750*b* are also formed on non-active surfaces 770*a*, 770*b* of anode and cathode plates 700*a*, 700*b*, respectively. Coolant flow field channels 750*a*, 750*b* are fluidly connected to the first coolant supply manifold, formed by first coolant supply manifold opening 752*a* via coolant supply plenum 755*a* formed on the non-active surfaces 770*a*, 770*b* of anode and cathode plates 700*a*, 700*b*. Coolant flow field channels 750*a*, 750*b* are also fluidly connected to the first coolant exhaust manifold, formed by first coolant exhaust manifold opening 752*b* via coolant exhaust plenum 755*b* formed on the non-active surfaces 770*a*, 770*b* of anode and cathode plates 700*a*, 700*b*. As shown, when a plurality of fuel cells comprising anode and cathode plates 700*a*, 700*b* are assembled into a fuel cell stack, the coolant supply and exhaust plenums and the fuel and oxidant supply and exhaust plenums of each adjoining pair of anode and cathode plates are staggered such that, in the direction perpendicular to the plane of the fuel cells, the fuel, oxidant and coolant supply and exhaust plenums do not overlap.

Figure 8:
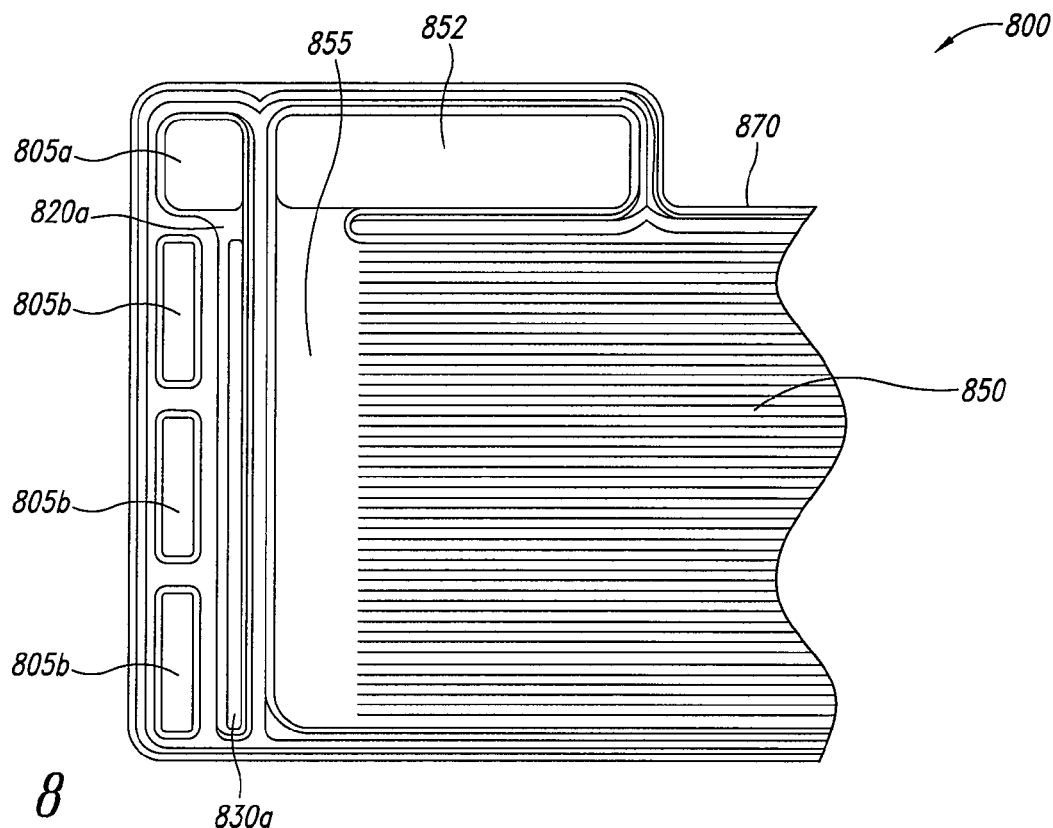
FIG. 8 is a partial plan view of the non-active surface of a reactant plate of an electrochemical fuel cell stack having both side and end reactant manifolds according to a fourth illustrated embodiment.

FIG. 8 is a partial plan view of the non-active surface 870 of a reactant plate 800 of an electrochemical fuel cell stack having both side and end reactant manifolds according to a fourth illustrated embodiment. As noted above with respect to the embodiments of FIGS. 5A-5D, 6A-6B and 7A-7D, and as shown in FIG. 8, reactant supply and exhaust manifold openings and coolant supply and exhaust manifold openings may, in variations of the foregoing embodiments, comprise both end and side manifolds. For example, as shown, reactant plate 800 comprises a plurality of manifold openings extending therethrough, namely, reactant supply manifold openings 805*a*, 805*b* and coolant supply manifold opening 852. When a plurality of reactant plates 800 are assembled into a fuel cell stack, reactant supply manifold openings 805*a* align to form a side reactant supply manifold, reactant supply manifold openings 805*b* align to form end reactant supply manifolds, and coolant supply manifold openings align to form side coolant supply manifolds.

As in the previous embodiments, when a plurality of fuel cells comprising reactant plate 800 are assembled into a fuel cell stack, the reactant supply plenums and the coolant supply plenums of each adjoining pair of anode and cathode plates are staggered such that, in the direction perpendicular to the plane of the fuel cells, the reactant and coolant supply plenums do not overlap. FIG. 8 shows a reactant supply backfeed channel 820*a*, a reactant supply backfeed port 830*a*, coolant supply plenum 855 and coolant flow field channels 850 to partially further illustrate this arrangement. In addition, as one of ordinary skill in the art will appreciate, a fuel cell comprising reactant plates 800 will have at least one straight side, which may aid in the packaging of a plurality of such a fuel cell into a fuel cell stack.

Figure 9:
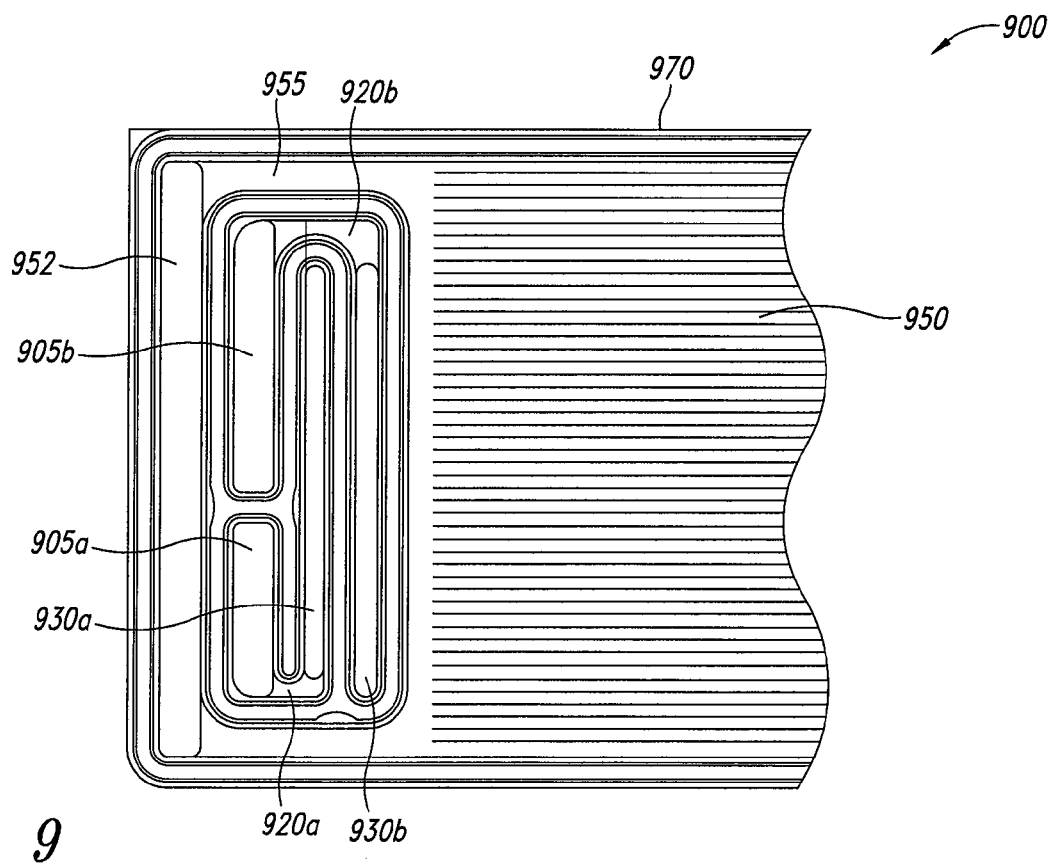
FIG. 9 is a partial plan view of the non-active surface of a reactant plate of an electrochemical fuel cell stack having end reactant manifolds according to a fifth illustrated embodiment.

Similar to FIG. 8, FIG. 9 is a partial plan view of the non-active surface 970 of a reactant plate 900 of an electrochemical fuel cell stack having end reactant manifolds according to a fifth illustrated embodiment. Again, as noted above with respect to the embodiments of FIGS. 5A-5D, 6A-6B and 7A-7D, and as shown in FIG. 9, reactant supply and exhaust manifold openings and coolant supply and exhaust manifold openings may, in variations of the foregoing embodiments, comprise end manifolds. For example, as shown, reactant plate 900 comprises a plurality of manifold openings extending therethrough, namely, reactant supply manifold openings 905*a*, 905*b* and coolant supply manifold opening 952. When a plurality of reactant plates 900 are assembled into a fuel cell stack, reactant supply manifold openings 905*a*, 905*b* and coolant supply manifold openings 952 align to form end reactant and coolant supply manifolds.

As in the previous embodiments, when a plurality of fuel cells comprising reactant plate 900 are assembled into a fuel cell stack, the reactant supply plenums and the coolant supply plenums of each adjoining pair of anode and cathode plates are staggered such that, in the direction perpendicular to the plane of the fuel cells, the reactant and coolant supply plenums do not overlap. FIG. 9 shows reactant supply backfeed channels 920*a*, 920*b*, reactant supply backfeed ports 930*a*, 930*b*, coolant supply plenum 955 and coolant flow field channels 950 to partially further illustrate this arrangement. The illustrated embodiment may also somewhat thermally isolate the reactant supply manifolds formed by aligned reactant supply manifold openings 905*a*, 905*b* from the edges of fuel cells comprising reactant plate 900, which can be beneficial for water management in those manifolds. Furthermore, as in the embodiment of FIG. 8 and as one of ordinary skill in the art will appreciate, a fuel cell comprising reactant plates 900 will have at least two straight sides, which may aid in the packaging of a plurality of such a fuel cell into a fuel cell stack.

Figure 10A:
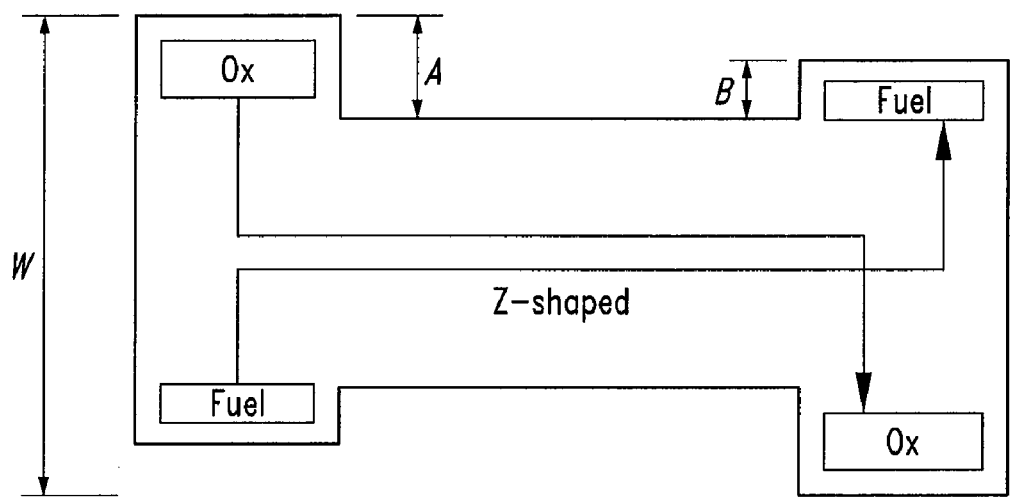
FIGS. 10A and 10B are diagrams illustrating the reactant fluid flow path through two representative electrochemical fuel cells.
Figure 10B:
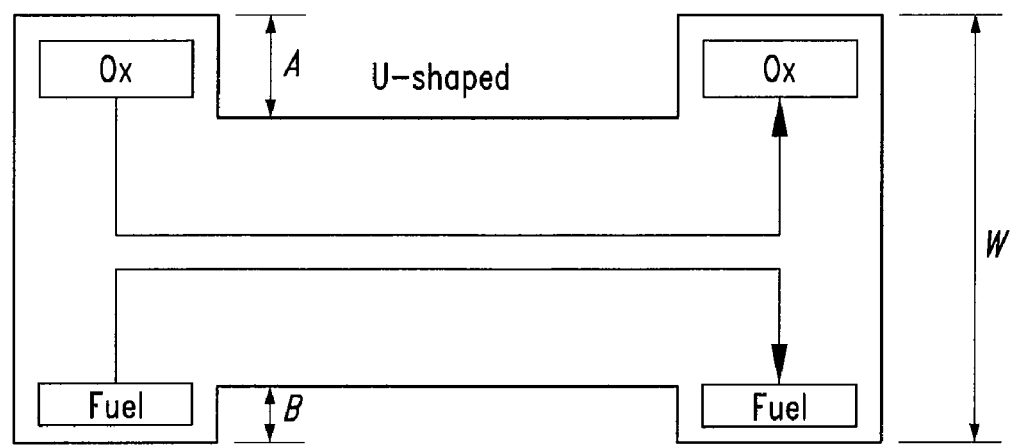

FIGS. 10A and 10B are diagrams illustrating the reactant fluid flow path through two representative electrochemical fuel cells. As noted above with respect to the disclosed embodiments, the fuel and oxidant manifolds are positioned on opposing sides of the fuel cells and the fuel and oxidant exhaust manifolds are positioned on opposing sides of the fuel cells. Furthermore, the fuel supply and exhaust manifolds may be positioned on opposing sides of the fuel cells and the oxidant supply and exhaust manifolds may be positioned on opposing sides of the fuel cells, thereby yielding a Z-shaped reactant flow (as shown in FIG. 10A) or the fuel supply and exhaust manifolds may be positioned on the same side of the fuel cells and the oxidant supply and exhaust manifolds may be positioned on the same side of the fuel cells, thereby yielding a U-shaped reactant flow (as shown in FIG. 10B). If the fuel and oxidant manifold ports are of different widths (shown as B and A, respectively, in FIGS. 10A and 10B), then a fuel cell comprising U-shaped reactant flow would have a smaller width (shown as W in FIGS. 10A and 10B) as compared to a fuel cell comprising Z-shaped fluid flow since the narrower fuel manifolds would be positioned along the same side of the fuel cell.

In addition to eliminating the constraints regarding the depth of certain elements of the reactant passageways, such as the reactant plenums, encountered in conventional fuel cell stack designs, the illustrated embodiments also provide further advantages. For example, the length of the reactant plenum required to yield a certain amount of flowsharing between the reactant flow field channels may be reduced in view of the increase in the depth of the reactant plenums. Thus, for a given fuel cell length, the length of the active area may be increased. By positioning the reactant manifolds on the sides of the fuel cells, certain of the illustrated embodiments provide for even further increases in the length of the active area. In addition, by reducing the length of the reactant plenums, the "open" (i.e., unsupported) area that the MEA must span is decreased, thereby reducing the stiffness and strength requirements of the MEA in those areas. Furthermore, for a given fuel cell length, the reactant flow field channels will be longer (due to shorter plenums). This in turn allows a higher flow resistance to be achieved for straight flow field channels of the same depth. Accordingly, this may effectively reduce the minimum fuel cell length required when employing straight flow field channels, as certain minimum flow resistances may be required to remove liquid water.

In any of the above embodiments, the disclosed separator plates may be made from any materials that are suitable for fuel cell separator plates. Typical properties for fuel cell separator plate materials include impermeability to reactant fluids, electrical conductivity, chemical compatibility with fuel cell reactant fluids and coolants, and physical compatibility with the anticipated operating environment, including temperature and the humidity of the reactant streams. For example, carbon composites have been disclosed as suitable materials. Expanded graphite composites may also be suitable materials. The disclosed fluid distribution channels (e.g., flow field channels, backfeed channels, etc . . . ) may be formed, for example, by embossing a sheet of expanded graphite material or molding a carbon composite material. Composite plate materials may further comprise a coating to improve one or more of the plate's desired properties. In addition, one of skill in the art will understand that the disclosed separator plates may also be made from other materials that are used to make conventional separator plates, such as, for example, metal.

While particular steps, elements, embodiments and applications of the present invention have been shown and described herein for purposes of illustration, it will be understood, of course, that the invention is not limited thereto since modifications may be made by persons skilled in the art, particularly in light of the foregoing teachings, without deviating from the spirit and scope of the invention. Accordingly, the invention is not limited except as by the appended claims.

What is claimed is:

1. An electrochemical fuel cell stack comprising:
 a plurality of electrochemical fuel cells, each comprising:
  an anode and a cathode;
  an anode plate having an active surface facing the anode and an oppositely facing non-active surface, wherein the anode plate active surface comprises a plurality of parallel linear fuel flow field channels, and the anode plate further comprises a fuel supply manifold opening and a fuel supply plenum that fluidly connects the fuel flow field channels to the fuel supply manifold opening, a fuel supply backfeed channel at least partially formed on the non-active surface of the anode plate, and a fuel supply backfeed port extending through the anode plate that fluidly connects the fuel supply backfeed channel and the fuel supply plenum, wherein the fuel supply backfeed channel of each fuel cell is also at least partially formed on the non-active surface of the adjoining cathode plate of an adjacent fuel cell; and
  a cathode plate having an active surface facing the cathode and an oppositely facing non-active surface, wherein the cathode plate active surface comprises a plurality of parallel linear oxidant flow field channels, and the cathode plate further comprises an oxidant supply manifold opening and an oxidant supply plenum that fluidly connects the oxidant flow field channels to the oxidant supply manifold opening, wherein, with respect to each adjoining anode plate and cathode plate in a pair of adjacent fuel cells in the stack, the fuel and oxidant supply plenums of the adjoining anode and cathode plates are staggered so as not to overlap in the direction perpendicular to the plane of the fuel cells, wherein the total height of the fuel supply plenum plus the fuel supply backfeed channel is greater than the thickness of the anode plate.

2. The electrochemical fuel cell stack of claim 1 wherein:
the cathode plate of each fuel cell further comprises an oxidant supply backfeed channel at least partially formed on the non-active surface of the cathode plate, and a oxidant supply backfeed port extending through the cathode plate that fluidly connects the oxidant supply backfeed channel and the oxidant supply plenum.

3. The electrochemical fuel cell stack of claim 2 wherein:
the oxidant supply backfeed channel of each fuel cell is also at least partially formed on the non-active surface of the adjoining anode plate of an adjacent fuel cell.

4. The electrochemical fuel cell stack of claim 2 wherein the fuel supply backfeed port comprises the fuel supply plenum and the oxidant supply backfeed port comprises the oxidant supply plenum.

5. The electrochemical fuel cell stack of claim 1, wherein:
the anode plate further comprises a fuel exhaust manifold opening and a fuel exhaust plenum that fluidly connects the fuel flow field channels to the fuel exhaust manifold opening; and the cathode plate further comprises an oxidant exhaust manifold opening and an oxidant exhaust plenum that fluidly connects the oxidant flow field channels to the oxidant exhaust manifold opening, wherein, with respect to each adjoining anode plate and cathode plate in a pair of adjacent fuel cells in the stack, the fuel and oxidant exhaust plenums of the adjoining anode and cathode plates are staggered so as not to overlap in the direction perpendicular to the plane of the fuel cells.

6. The electrochemical fuel cell stack of claim 5 wherein:
the anode plate of each fuel cell further comprises a fuel exhaust backfeed channel at least partially formed on the non-active surface of the anode plate, and a fuel exhaust backfeed port extending through the anode plate that fluidly connects the fuel exhaust backfeed channel and the fuel exhaust plenum; and the cathode plate of each fuel cell further comprises an oxidant exhaust backfeed channel at least partially formed on the non-active surface of the cathode plate, and an oxidant exhaust backfeed port extending through the cathode plate that fluidly connects the oxidant exhaust backfeed channel and the oxidant exhaust plenum.

7. The electrochemical fuel cell stack of claim 6 wherein:
the fuel exhaust backfeed channel of each fuel cell is also at least partially formed on the non-active surface of the adjoining cathode plate of an adjacent fuel cell; and
the oxidant exhaust backfeed channel of each fuel cell is also at least partially formed on the non-active surface of the adjoining anode plate of an adjacent fuel cell.

8. The electrochemical fuel cell stack of claim 7 wherein the total height of the fuel exhaust plenum plus the fuel exhaust backfeed channel is greater than the thickness of the anode plate.

9. The electrochemical fuel cell stack of claim 7 wherein the total height of the oxidant exhaust plenum plus the oxidant exhaust backfeed channel is greater than the thickness of the cathode plate.

10. The electrochemical fuel cell stack of claim 6 wherein the fuel exhaust backfeed port comprises the fuel exhaust plenum and the oxidant exhaust backfeed port comprises the oxidant exhaust plenum.

11. The electrochemical fuel cell stack of claim 10 wherein the fuel and oxidant supply and exhaust backfeed ports of each fuel cell are rectangular in shape and extend along the ends of the fuel cells.

12. The electrochemical fuel cell stack of claim 5, wherein, with respect to each adjoining anode plate and cathode plate in a pair of adjacent fuel cells in the stack, the fuel supply and exhaust plenums of the adjoining anode plate are staggered so as not to overlap either of the oxidant supply and exhaust plenums of the adjoining cathode plate, in the direction perpendicular to the plane of the fuel cells.

13. The electrochemical fuel cell stack of claim 12 wherein the fuel and oxidant supply and exhaust manifold openings form edge fuel and oxidant supply and exhaust manifolds.

14. The electrochemical fuel cell stack of claim 12 wherein the fuel and oxidant supply and exhaust manifold openings form end fuel and oxidant supply and exhaust manifolds.

15. The electrochemical fuel cell stack of claim 12 wherein the fuel and oxidant supply and exhaust manifold openings form side fuel and oxidant supply and exhaust manifolds.

16. The electrochemical fuel cell stack of claim 15 wherein:
the fuel supply and exhaust manifolds are positioned on the same side of the fuel cells; and
the oxidant supply and exhaust manifolds are positioned on the same side of the fuel cells.

17. The electrochemical fuel cell stack of claim 15 wherein:
the fuel and oxidant supply manifolds are positioned on opposing sides of the fuel cells; and
the fuel and oxidant exhaust manifolds are positioned on opposing sides of the fuel cells.

18. The electrochemical fuel cell stack of claim 5, wherein each fuel cell further comprises:
a plurality of parallel linear coolant flow field channels formed on the non-active surfaces of the anode and cathode plates;
a first coolant supply manifold opening; and
a coolant supply plenum that fluidly connects the coolant flow field channels to the first coolant supply manifold opening,
wherein, with respect to each adjoining anode plate and cathode plate in a pair of adjacent fuel cells in the stack, the coolant supply plenum and the fuel and oxidant supply and exhaust plenums of the adjoining anode and cathode plates are staggered so as not to overlap in the direction perpendicular to the plane of the fuel cells.

19. The electrochemical fuel cell stack of claim 18, wherein each fuel cell further comprises:
a first coolant exhaust manifold opening, and a coolant exhaust plenum that fluidly connects the coolant flow field channels to the first coolant exhaust manifold opening; and
wherein, with respect to each adjoining anode plate and cathode plate in a pair of adjacent fuel cells in the stack, the coolant exhaust plenum and the fuel and oxidant supply and exhaust plenums of the adjoining anode and cathode plates are staggered so as not to overlap in the direction perpendicular to the plane of the fuel cells.

20. The electrochemical fuel cell stack of claim 19, wherein each fuel cell further comprises:
    a second coolant supply manifold opening; and
    a second coolant exhaust manifold opening,
    wherein the coolant supply and exhaust plenums also fluidly connect the coolant flow field channels to the second coolant supply and exhaust manifold openings, respectively.

21. The electrochemical fuel cell stack of claim 20 wherein:
    the first and second coolant supply and exhaust manifold openings form side first and second coolant supply and exhaust manifolds;
    the first and second coolant supply manifolds are positioned on opposing sides of the fuel cells; and
    the first and second coolant exhaust manifolds are positioned on opposing sides of the fuel cells.

22. An electrochemical fuel cell stack comprising:
    a plurality of electrochemical fuel cells, each comprising:
    an anode and a cathode;
    an anode plate having an active surface facing the anode and an oppositely facing non-active surface, wherein the anode plate active surface comprises a plurality of parallel linear fuel flow field channels, and the anode plate further comprises a fuel supply manifold opening and a fuel supply plenum that fluidly connects the fuel flow field channels to the fuel supply manifold opening; and
    a cathode plate having an active surface facing the cathode and an oppositely facing non-active surface, wherein the cathode plate active surface comprises a plurality of parallel linear oxidant flow field channels, and the cathode plate further comprises an oxidant supply manifold opening and an oxidant supply plenum that fluidly connects the oxidant flow field channels to the oxidant supply manifold opening, an oxidant supply backfeed channel at least partially formed on the non-active surface of the cathode plate, and a oxidant supply backfeed port extending through the cathode plate that fluidly connects the oxidant supply backfeed channel and the oxidant supply plenum, wherein the oxidant supply backfeed channel of each fuel cell is also at least partially formed on the non-active surface of the adjoining anode plate of an adjacent fuel cell,
    wherein, with respect to each adjoining anode plate and cathode plate in a pair of adjacent fuel cells in the stack, the fuel and oxidant supply plenums of the adjoining anode and cathode plates are staggered so as not to overlap in the direction perpendicular to the plane of the fuel cells,
    wherein the total height of the oxidant supply plenum plus the oxidant supply backfeed channel is greater than the thickness of the cathode plate.

* * * * *